(12) United States Patent
Krishnan et al.

(10) Patent No.: US 9,880,332 B2
(45) Date of Patent: Jan. 30, 2018

(54) DECORATIVE MICROSPHERE ARTICLES WITH INFORMATION LAYER

(71) Applicant: 3M INNOVATIVE PROPERTIES COMPANY, St. Paul, MN (US)

(72) Inventors: Vivek Krishnan, St. Paul, MN (US); Matthew T Holbrook, White Bear Lake, MN (US); Sharon Wang, St. Paul, MN (US); Toheeb B. Alabi, Woodbury, MN (US); Steven J. McMan, Stillwater, MN (US); Kyle E Kulseth, St. Paul, MN (US); Steven Hin-Chung Kong, Woodbury, MN (US); Alexander J. Kugel, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 60 days.

(21) Appl. No.: 15/025,936

(22) PCT Filed: Oct. 3, 2014

(86) PCT No.: PCT/US2014/059015
§ 371 (c)(1),
(2) Date: Mar. 30, 2016

(87) PCT Pub. No.: WO2015/051237
PCT Pub. Date: Apr. 9, 2015

(65) Prior Publication Data
US 2016/0238768 A1    Aug. 18, 2016

Related U.S. Application Data

(60) Provisional application No. 61/886,964, filed on Oct. 4, 2013.

(51) Int. Cl.
G02B 5/30    (2006.01)
G02B 5/02    (2006.01)

(52) U.S. Cl.
CPC .............. *G02B 5/305* (2013.01); *G02B 5/02* (2013.01); *G02B 5/0242* (2013.01); *G02B 5/0263* (2013.01); *G02B 5/0284* (2013.01)

(58) Field of Classification Search
CPC ........ G02B 5/02; G02B 5/0205; G02B 5/021; G02B 5/0226; G02B 5/0236;
(Continued)

(56) References Cited

U.S. PATENT DOCUMENTS 4,849,265 A    7/1989    Ueda
5,620,775 A    4/1997    LaPerre
(Continued)

FOREIGN PATENT DOCUMENTS

EP    1389537    2/2004

OTHER PUBLICATIONS

International Search report for PCT International Application No. PCT/US2014/059015 dated Jan. 8, 2015, 3 pages.

*Primary Examiner* — Arnel C Lavarias
(74) *Attorney, Agent, or Firm* — Steven A. Bern

(57) ABSTRACT

Multilayer stacks that can be used as decorative microsphere articles. The decorative microsphere articles can be a durable and aesthetically pleasing substitute for anodized aluminum and other matte metallic surfaces. The decorative microsphere articles are durable and can have a bright diffused appearance of any desired color, for example white, gold, silver, red, or other colors, while being capable of being manufactured using a roll-to-roll process. The decorative microsphere articles can also provide novel optical effects than can change at different viewing angles, including, for example, changing color with view angle, changing sharpness or clarity of an image or icon with view angle, and (Continued)

the like, that may allow customers to differentiate their products.

20 Claims, 6 Drawing Sheets

(58) Field of Classification Search
CPC .. G02B 5/0242; G02B 5/0273; G02B 5/0284; G02B 5/0294; G02B 5/30; G02B 5/3008; G02B 5/3025; G02B 5/3033; G02B 5/3041; G02B 5/305
USPC ..... 359/599, 601, 609, 613, 493.01, 485.01, 359/485.03, 489.01, 489.06, 489.07, 359/491.01; 362/19; 353/20
See application file for complete search history.

(56) References Cited

U.S. PATENT DOCUMENTS

| | | | |
|---|---|---|---|
| 6,018,419 A | 1/2000 | Cobb, Jr. | |
| 6,060,157 A | 5/2000 | LaPerre | |
| 6,208,466 B1 | 3/2001 | Liu | |
| 6,268,961 B1 * | 7/2001 | Nevitt | G02B 5/0226 349/84 |
| 8,111,352 B2 | 2/2012 | Stalder | |
| 2011/0045306 A1 | 2/2011 | Johnson | |
| 2011/0123786 A1 | 5/2011 | Johnson | |
| 2012/0212812 A1 * | 8/2012 | Weber | G03B 21/604 359/454 |

* cited by examiner

US 9,880,332 B2

DECORATIVE MICROSPHERE ARTICLES WITH INFORMATION LAYER

CROSS REFERENCE TO RELATED APPLICATIONS

This application is a national stage filing under 35 U.S.C. 371 of PCT/US2014/059015, filed Oct. 3, 2014, which claims the benefit of U.S. Provisional Application No. 61/886964 filed Oct. 4, 2013, the disclosure of which is incorporated by reference in its/their entirety herein.

BACKGROUND

Decorative protective surfaces have many consumer and industrial applications. Household appliances, automotive interiors and paints, consumer electronic devices such as laptops and hand held devices, are all examples where the consumer desires materials that offer considerable protection from scratches, wear, and abrasion, while retaining superior aesthetics throughout the material lifecycle. Low-gloss matte surfaces are of particular interest to many consumers because of their cosmetic and aesthetic appeal.

Of the many enclosure materials used by the electronics industry, anodized aluminum has found widespread use in electronic devices such as laptops and mobile phones due to its light weight, durability, and pleasing aesthetics. Materials such as polymeric materials that can mimic the appearance of anodized aluminum, are desired as an alternative to metallic enclosures.

SUMMARY

The present disclosure provides multilayer stacks that can be used as decorative microsphere articles. The decorative microsphere articles can be a durable and aesthetically pleasing substitute for anodized aluminum and other matte metallic surfaces. The decorative microsphere articles are durable and can have a bright diffused appearance of any desired color, for example white, gold, silver, red, or other colors, while being capable of being manufactured using a roll-to-roll process. The decorative microsphere articles can also provide novel optical effects than can change at different viewing angles, including, for example, changing color with view angle, changing sharpness or clarity of an image or icon with view angle, and the like, that may allow customers to differentiate their products.

In one aspect, the present disclosure provides a multilayer stack that includes a light scattering layer for scattering light disposed on a viewing side of the multilayer stack and adapted to face a viewer; an information layer for displaying information to a viewer viewing the multilayer stack from the viewing side, the information layer being disposed on a back side of the multilayer stack opposite the viewing side and adapted to face away from a viewer; and a multilayer film reflecting at least 80% of normally incident light having a first polarization state, the multilayer film disposed between the light scattering layer and the information layer, the information being less viewable by a viewer viewing the multilayer stack from the viewing side along a first direction normal to the multilayer stack than along a second direction making an acute angle with the first direction. In another aspect, the present disclosure provides an electronic device including the multilayer stack.

In yet another aspect, the present disclosure provides a multilayer stack that includes an optically opaque layer having a total optical transmittance of less than 5%; an information layer comprising indicia disposed on the optically opaque layer; a multilayer film disposed on the information layer and reflecting by optical interference at least 80% of normally incident light having a first polarization state and at least 80% of normally incident light having a second polarization state orthogonal to the first polarization state; and a light scattering layer disposed on the multilayer film, such that when the multilayer stack is viewed from the light scattering side and as compared to a multilayer stack that has the same construction except for not having the light scattering layer, the indicia is substantially equally discernible along a first direction normal to the multilayer stack and substantially more discernible along a second direction making an acute angle with the first direction. In yet another aspect, the present disclosure provides an electronic device including the multilayer stack.

In yet another aspect, the present disclosure provides a multilayer stack that includes a light scattering layer for scattering light disposed on a viewing side of the multilayer stack and adapted to face a viewer; an information layer for displaying information to a viewer viewing the multilayer stack from the viewing side, the information layer being disposed on a back side of the multilayer stack opposite the viewing side and adapted to face away from a viewer, the information including indicia; and a multilayer film reflecting at least 80% of normally incident light having a first polarization state, the multilayer film disposed between the light scattering layer and the information layer, the information being equally viewable by a viewer viewing the multilayer stack from the viewing side along a first direction normal to the multilayer stack and along a second direction making an acute angle with the first direction, the acute angle being at least 40 degrees. In yet another aspect, the present disclosure provides an electronic device including the multilayer stack.

In yet another aspect, the present disclosure provides a multilayer stack that includes a light scattering layer for scattering light disposed on a viewing side of the multilayer stack and adapted to face a viewer; an optically opaque layer having a total optical transmittance of less than 5% disposed on a back side of the multilayer stack opposite the viewing side and adapted to face away from a viewer; an information layer for displaying information to a viewer viewing the multilayer stack from the viewing side, the information layer disposed between the light scattering layer and the optically opaque layer; and a multilayer film reflecting at least 80% of normally incident light having a first polarization state, the multilayer film disposed between the light scattering layer and the information layer, the information being equally viewable by a viewer viewing the multilayer stack from the viewing side along a first direction normal to the multilayer stack and along a second direction making an acute angle with the first direction. In yet another aspect, the present disclosure provides an electronic device including the multilayer stack.

In yet another aspect, the present disclosure provides a multilayer stack that includes an optically opaque layer having a total optical transmittance of less than 5%; an information layer having indicia disposed on the optically opaque layer; and a multilayer film disposed on the information layer and reflecting by optical interference at least 80% of each of two mutually orthogonal polarization states. In yet another aspect, the present disclosure provides an electronic device including the multilayer stack.

In yet another aspect, the present disclosure provides a multilayer stack that includes an optically opaque layer having a total optical transmittance of less than 5%; an information layer comprising indicia disposed on the optically opaque layer; and a multilayer film disposed on the information layer and reflecting by optical interference at least 80% of each of two mutually orthogonal polarization states in a first region of a visible range of the electromagnetic spectrum and transmitting by optical interference at least 80% of each of the two mutually orthogonal polarization states in remaining regions of the visible range of the electromagnetic spectrum. In yet another aspect, the present disclosure provides an electronic device including the multilayer stack.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
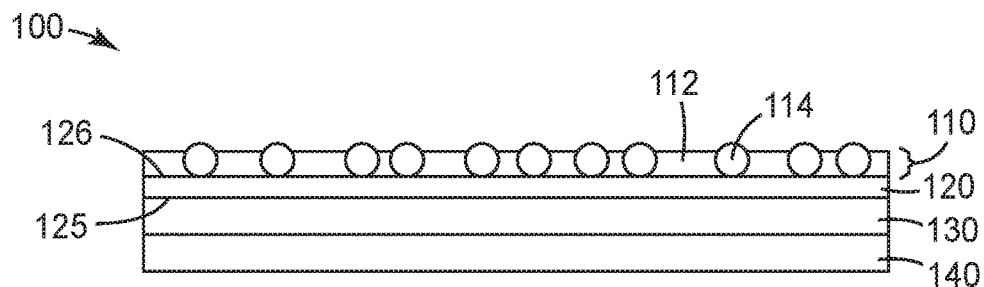
FIG. 1 shows a schematic cross-section of a decorative microsphere article.

The present disclosure describes multilayer stacks that can be used as decorative microsphere articles. The decorative microsphere articles can be a durable and aesthetically pleasing substitute for anodized aluminum and other matte metallic surfaces. The decorative microsphere articles are durable and can have a bright diffused appearance of any desired color, for example white, gold, silver, red, or other colors, while being capable of being manufactured using a roll-to-roll process. The decorative microsphere articles can also provide novel optical effects than can change at different viewing angles, including, for example, changing color with view angle, changing sharpness or clarity of an image or icon with view angle, and the like, that may allow customers to differentiate their products.

In some cases, novel color shifting effects can be observed, particularly when partially exposed microspheres (i.e., beads) are stacked onto a multilayer optical film (MOF) such as an enhanced specular reflector (ESR) film using a clear binder. For example, coating the back side of the MOF film with a black pigmented layer produces a faint bluish hue at normal incidence angles that turns into a rich blue coloration when the sample is viewed through the bead side at higher incidence angles. The partially exposed microspheres on top of the MOF film help produce a very sharp image, which may be a hidden image, that can be advantageously used to print company logos or other indicia as requested by customers. Colors other than black may also be coated or spray painted behind the MOF film to realize similar effects. Colors may be coated in regular or irregular patterns.

In one particular embodiment, light scattering elements such as solid glass microspheres (also referred to as beads) have been used to impart surface protection and aesthetics to decorative films. Low gloss, diffuse reflective films can result from glass microspheres being at least partially embedded in a clear polymer layer stacked on top of a film, such as a multilayer optical film. The decorative films have a bright white diffused appearance somewhat like anodized aluminum, and are much easier to manufacture. By modifying the optical stack, different colors and color shifting effects can be observed. Glass beads can also impart abrasion resistance and a smooth tactile feel to the decorative film. The decorative films can be made using glass, ceramic, polymeric, or hybrid combinations of glass, ceramic, or polymeric beads that are at least partially embedded in a polyurethane matrix bonded on one surface of a support or substrate film, such as a multilayer optical film.

Articles made according to the present disclosure can be highly diffusely reflective and have a low gloss, making them attractive for use as decorative films. The bead surfaces can have excellent smooth tactile feel and abrasion resistance, due to the presence of a monolayer of microspheres on the surface, making them valuable as surface protection films.

In the following description, reference is made to the accompanying drawings that forms a part hereof and in which are shown by way of illustration. It is to be understood that other embodiments are contemplated and may be made without departing from the scope or spirit of the present disclosure. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

As used herein, when an element, component or layer for example is described as forming a "coincident interface" with, or being "on" "connected to," "coupled with" or "in contact with" another element, component or layer, it can be directly on, directly connected to, directly coupled with, in direct contact with, or intervening elements, components or layers may be on, connected, coupled or in contact with the particular element, component or layer, for example. When an element, component or layer for example is referred to as being "directly on," "directly connected to," "directly coupled with," or "directly in contact with" another element, there are no intervening elements, components or layers for example.

As used herein, "have", "having", "include", "including", "comprise", "comprising" or the like are used in their open ended sense, and generally mean "including, but not limited to." It will be understood that the terms "consisting of" and "consisting essentially of" are subsumed in the term "comprising," and the like.

As used herein, the term "visible-light transmissive material" means a component or material through which light that can generally be perceived by the human eye can be transported. In some cases, the component or material may also exhibit extremely low absorption, scattering, or dispersion of light, although this may not be required. In some cases, the component or material may have absorption, scattering, or dispersion adjusted to provide desired optical effects that are either visible within the component or material, or visible in light patterns emitted from the component. In some cases, the component or material may also include optional colorants, fluorescers, wavelength down-converting elements, and the like, which do not detract from the use of the phrase "visible-light transmissive".

FIG. 1 shows a schematic cross-section of a decorative microsphere article 100, according to one aspect of the disclosure. Decorative microsphere article 100 is a multi-layer stack that includes a light scattering layer 110 disposed on a viewing surface 126 of a support layer 120. An optional information layer 130 is disposed on a backside surface 125 of support layer 120, opposite the viewing surface 126. An optional backing layer 140 is disposed adjacent the optional information layer 130, opposite the support layer 120.

Light scattering layer 110 includes a plurality of scattering elements 114 dispersed in a binder 112. In some cases, the scattering elements 114 can be located at the surface of the binder 112, and impart additional abrasion resistance to the decorative microsphere article 100, as shown in FIG. 1. In some cases, also as shown in FIG. 1, the plurality of scattering elements 114 can contact the support layer and also extend above the surface of the binder 112, although this may not be necessary, as described elsewhere. The scattering elements 114 can be particles having an effective diameter between about 1 to about 400 microns, or between about 2 to about 200 microns, or between about 2 and about 100 microns or less. In some cases, the scattering elements 114 can include organic particles including polymers such as acrylates, methacrylates, polystyrenes, polycarbonates, and the like; inorganic particles including glasses such as boro- silicate glass, and ceramics; hybrid particles including mixtures of polymers, glasses, and/or ceramics; or a combination of organic particles, inorganic particles, or hybrid particles. The scattering elements 114 can be distributed either uniformly or non-uniformly across the viewing surface 126, and there can be regions where there are no scattering elements 114.

The binder 112 can be any suitable binder that can mix with and adhere well to the scattering elements 114, and also adhere well to the viewing surface 126 of support layer 120. Suitable binders include, for example, polyurethanes, polyacrylates, polycarbonates, vinyls, styrenes, and the like. The refractive index of the binder 112 and the scattering elements 114 are preferably different to achieve the desired optical effects; in some cases, for example, a difference between indices of refraction of the binder and the scattering elements is at least 0.05, or preferably from about 0.1 to about 0.8, or more preferably from about 0.1 to about 0.2.

The support layer 120 (or substrate layer) can be selected to provide desired optical effects. In one particular embodiment, the support layer 120 can be reflective, such as, for example, a multilayer optical film including polymeric multilayer optical films such as, for example, an Enhanced Specular Reflective (ESR) film or a reflective polarizing film (DBEF), both available from 3M Company; inorganic multilayer optical films such as, for example, dichroic reflectors; or metalized films such as, for example, aluminum or silver coated polyester films. In one particular embodiment, the support layer 120 can instead be a colored or dyed film such as a dichroic filter, a dyed polymeric film, or a dyed reflective film.

The optional information layer 130 includes a variation in composition or structure between different local regions of the layer, the variations being capable of detection either visually, or by an optical sensor. In some cases, the optional information layer 130 includes a variation can be a variation in color, such as, for example, a stepwise or gradient change from a first color to a second color; color density, such as, for example, a stepwise or gradient change from a pastel to a vivid color; contrast, such as, for example, a stepwise or gradient change from white to grey or black; texture, such as, for example, a stepwise or gradient change in surface features; fluorescence or phosphorescence, such as, for example, a stepwise or gradient change of concentration of an ultraviolet fluorescent compound; and the like. In one particular embodiment, the variation can be a static image such as an icon, indicia, mark, picture, or symbol. In one particular embodiment, the variation can be a dynamic variation from a device such as a display (e.g., electronic paper) or it can be an image projected onto the optional information layer by a separate device (e.g., an image projector). In one particular embodiment, the optional information layer 130 can be as simple as a mark, for example made by printing, embossing, engraving, or using a marking pen, or other technique as known in the art, written on the backside 125 of the support layer 120. In one particular embodiment, the optional information layer 130 can be a light diffusing layer having a variation in light diffusing properties.

The optional backing layer 140 can be included, for example, to protect the optional information layer 130 and/or the support layer 120 from the environment, or to provide additional contrast to the variation provided in the optional information layer 130, for example a light blocking layer to prevent light from entering the decorative microsphere article 100 from the backside. In some cases, the optional backing layer 140 can be a colored, opaque, translucent, or transparent pressure-sensitive tape applied to the support layer 120 or the information containing layer 130.

Figure 2:
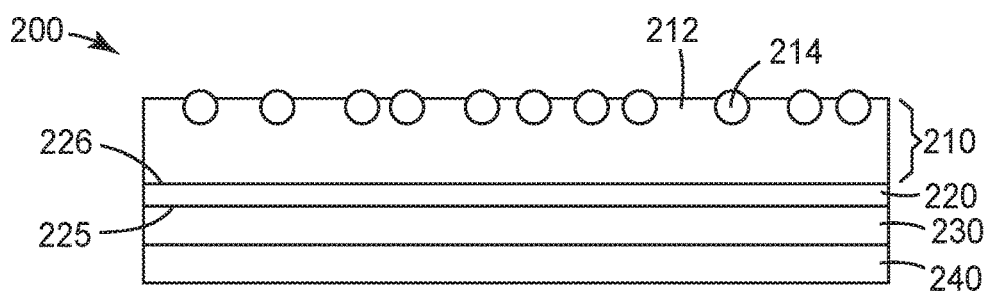
FIG. 2 shows a schematic cross-section of a decorative microsphere article.

FIG. 2 shows a schematic cross-section of a decorative microsphere article 200, according to one aspect of the disclosure. Each of the elements 210-240 shown in FIG. 2 correspond to like-numbered elements 110-140 shown in FIG. 1, which have been described previously. For example, support 220 shown in FIG. 2 corresponds to support 120 shown in FIG. 1, and so on. In FIG. 2, the light scattering layer 210 is a surface diffusing layer that includes the plurality of scattering elements 214 disposed near and extending beyond the surface of the binder 212, opposite the viewing surface 226 of support 220.

Figure 3:
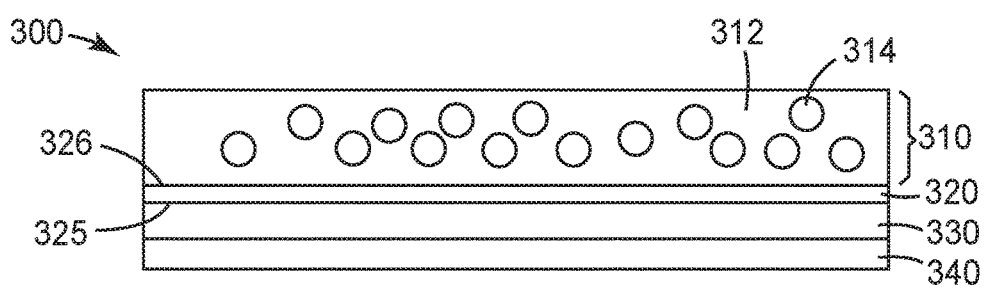
FIG. 3 shows a schematic cross-section of a decorative microsphere article.

FIG. 3 shows a schematic cross-section of a decorative microsphere article 300, according to one aspect of the disclosure. Each of the elements 310-340 shown in FIG. 3 correspond to like-numbered elements 110-140 shown in FIG. 1, which have been described previously. For example, support 320 shown in FIG. 3 corresponds to support 120 shown in FIG. 1, and so on. In FIG. 3, the light scattering layer 310 is a volume diffusing layer that includes the plurality of scattering elements 314 disposed throughout the binder 312 of the light scattering layer 310, without scattering elements 314 extending beyond the surface of the binder 312.

Figure 4:
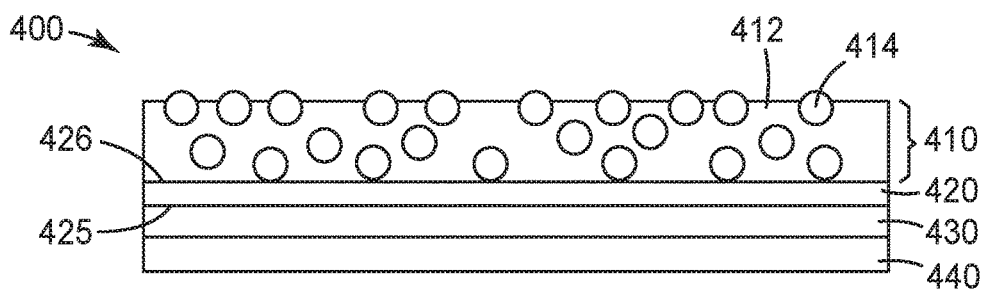
FIG. 4 shows a schematic cross-section of a decorative microsphere article.

FIG. 4 shows a schematic cross-section of a decorative microsphere article 400, according to one aspect of the disclosure. Each of the elements 410-440 shown in FIG. 4 correspond to like-numbered elements 110-140 shown in FIG. 1, which have been described previously. For example, support 420 shown in FIG. 4 corresponds to support 120 shown in FIG. 1, and so on. In FIG. 4, the light scattering layer 410 is a surface and volume diffusing layer that includes the plurality of scattering elements 414 disposed near and extending beyond the surface of the binder 412, opposite the viewing surface 426 of support 420, and also includes scattering elements 414 disposed throughout the binder 412 of the light scattering layer 410.

Figure 5:
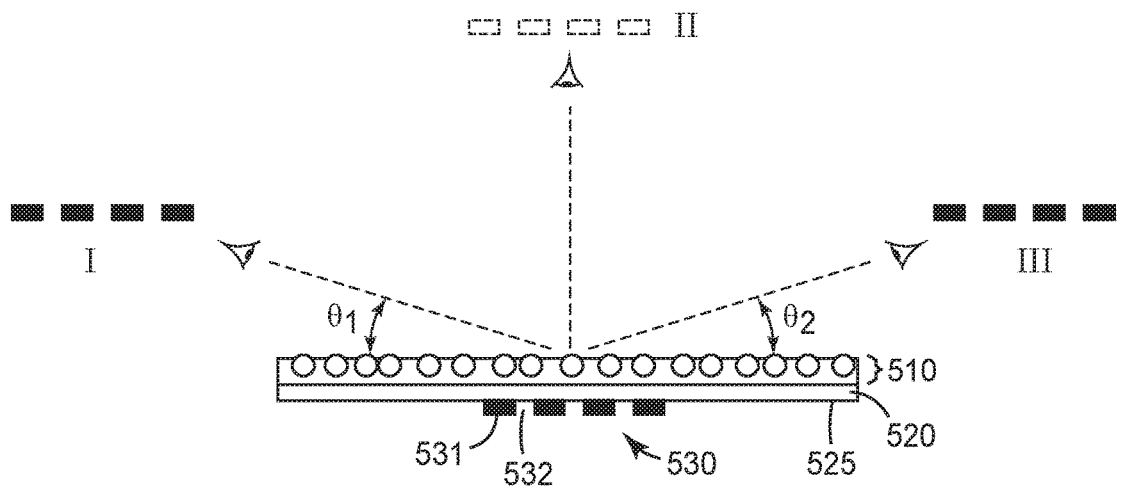
FIG. 5 shows a schematic of views from a decorative microsphere article.

FIG. 5 shows a schematic of views from a decorative microsphere article, according to one aspect of the disclosure. Each of the elements 510-530 shown in FIG. 5 correspond to like-numbered elements 110-130 shown in FIG. 1, which have been described previously. For example, support 520 shown in FIG. 5 corresponds to support 120 shown in FIG. 1, and so on. In FIG. 5, an information layer 530 is comprised of variations in a dark contrast region 531 and a light contrast region 532. Information layer 530 can, for example, be an icon, indicia, barcode, and the like, as described elsewhere. A viewer observing the information layer from acute angle $\theta_1$ can see the variations in dark contrast region 531 and light contrast region 532 as shown in image "I", but as the angle is increased to normal to the information layer 530, the variation in dark contrast region 531 and light contrast region 532 become more diffuse as shown in image "II", and difficult to discern the variation in the image "II". In a similar manner, a viewer observing the information layer from acute angle $\theta_2$ can see the variations in dark contrast region 531 and light contrast region 532 as shown in image "III", but as the angle is increased to normal to the information layer 530, the variation in dark contrast region 531 and light contrast region 532 again becomes more diffuse. In some cases, the changes that can be seen in the image vary continuously as the viewing angle is increased from an acute angle with the surface toward the normal to the surface. In some cases, the changes can be more abrupt, and even stepwise changes in the image can occur.

Figure 6:
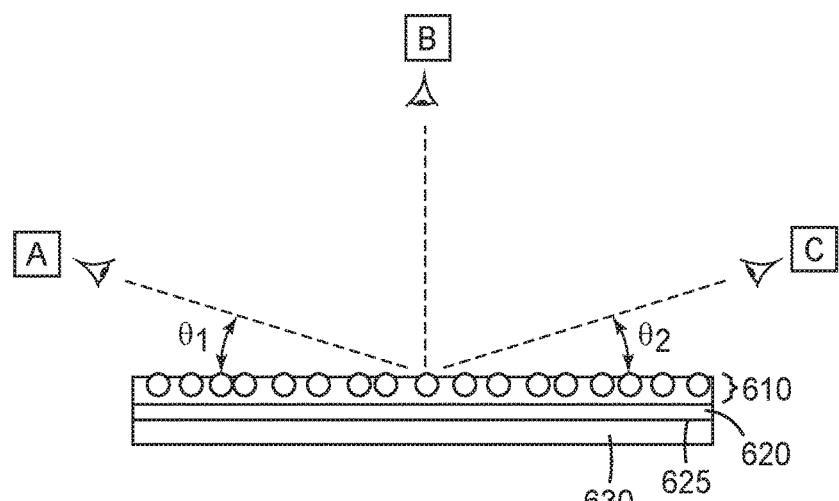
FIG. 6 shows a schematic of views from a decorative microsphere article.
Figure 7:
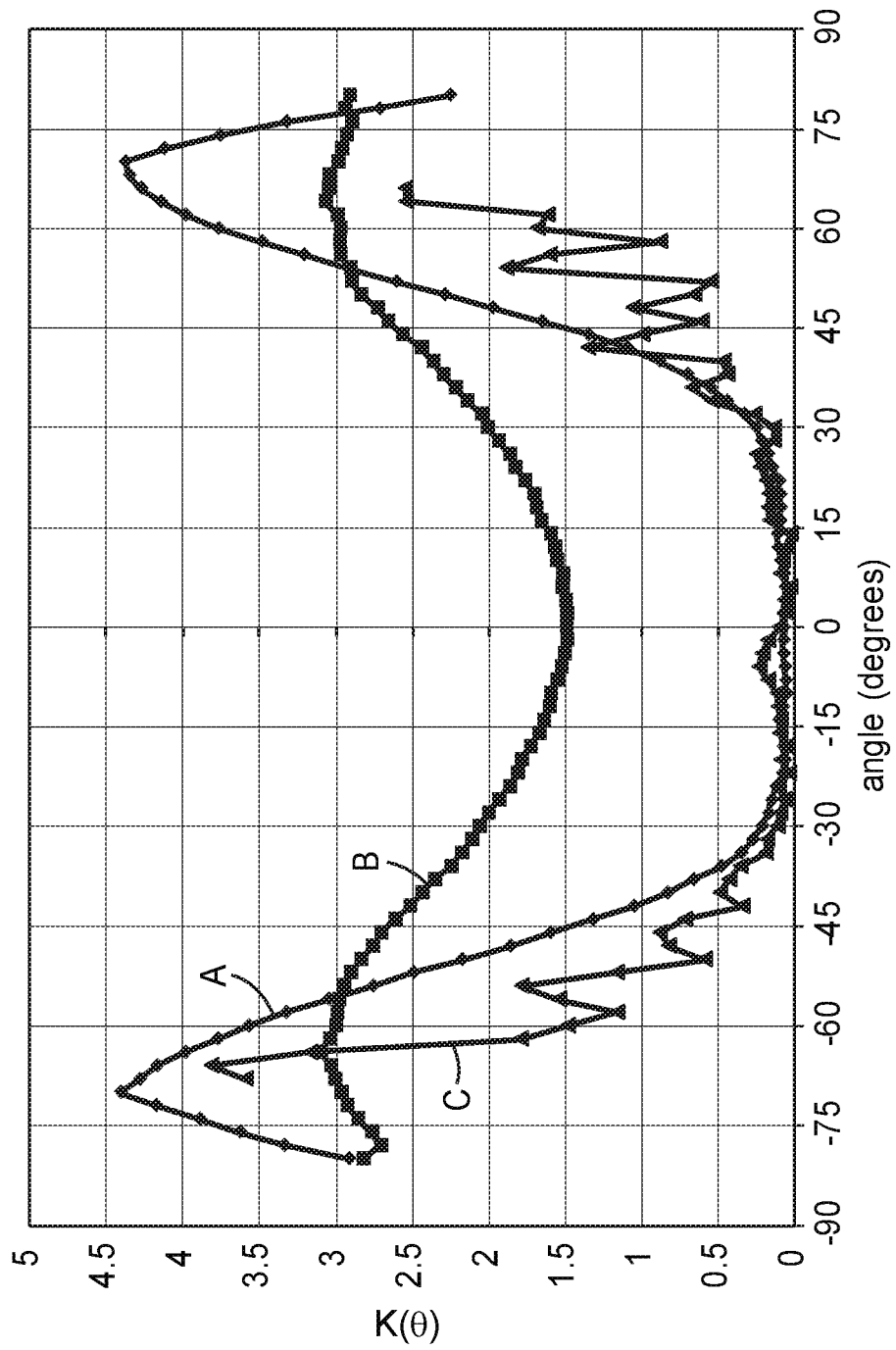
FIG. 7 shows a plot of contrast vs angle for decorative microsphere articles.
Figure 8:
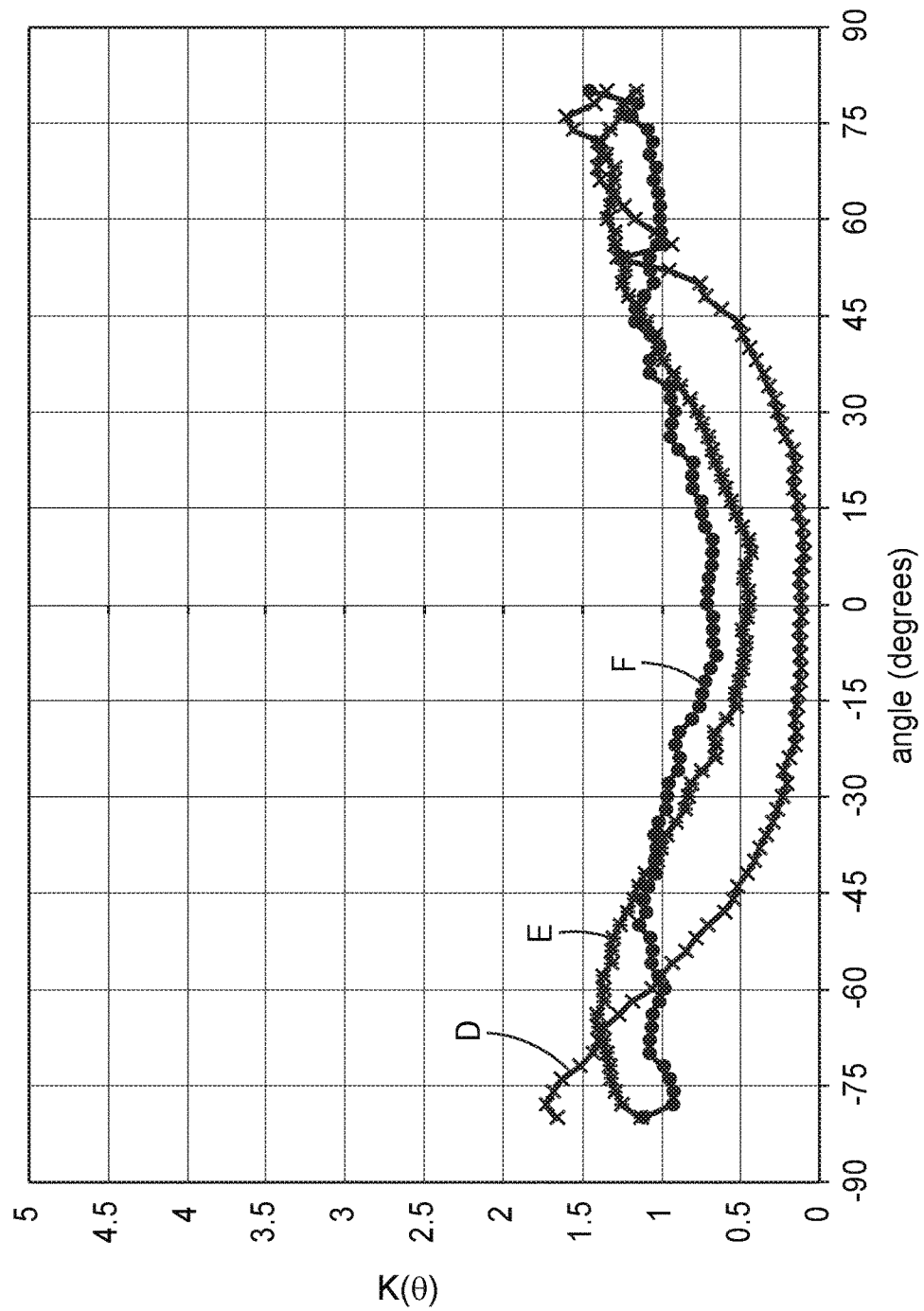
FIG. 8 shows a plot of contrast vs angle for decorative microsphere articles.
Figure 9A:
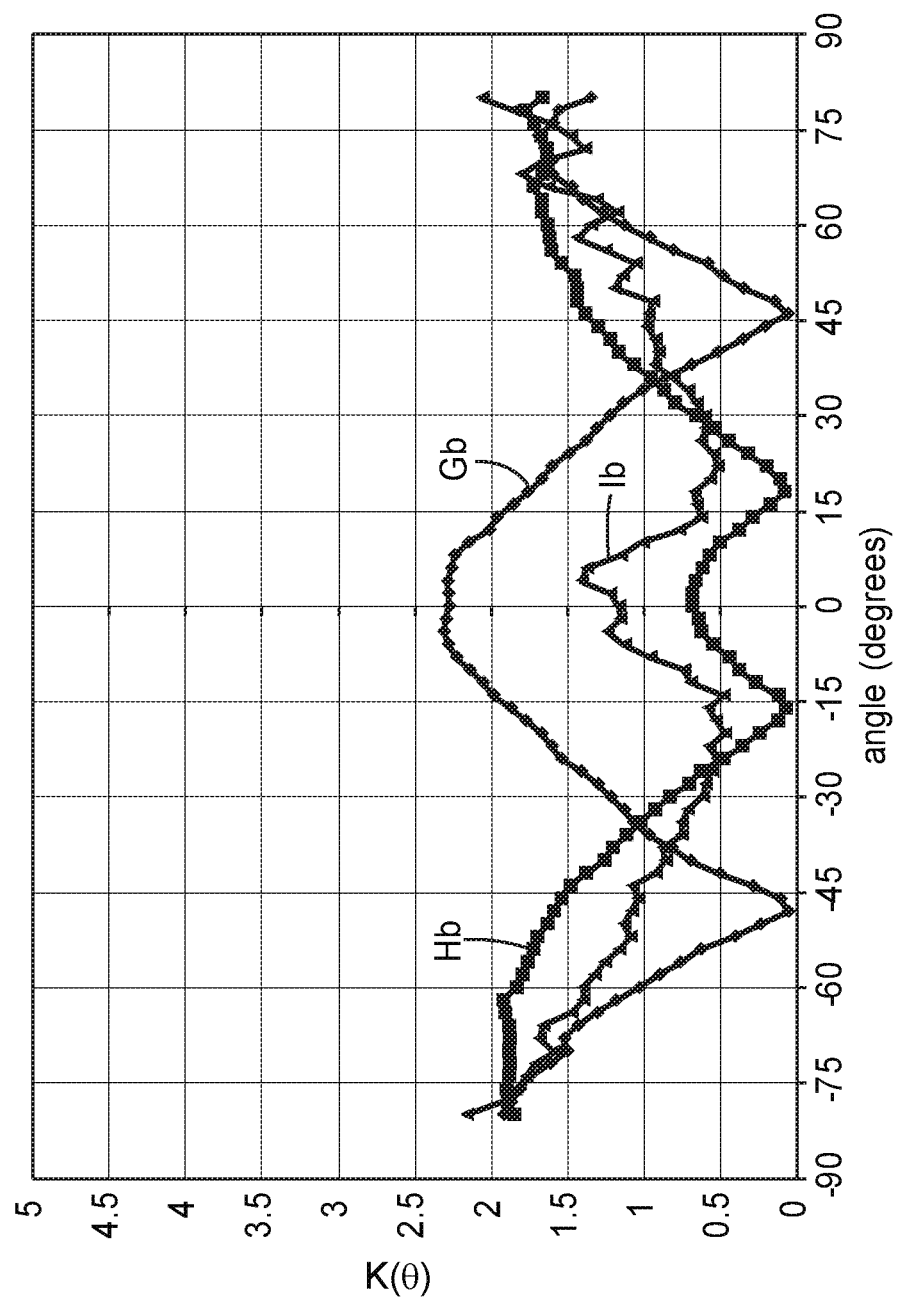
FIG. 9A shows a plot of contrast vs angle for decorative microsphere articles.
Figure 9B:
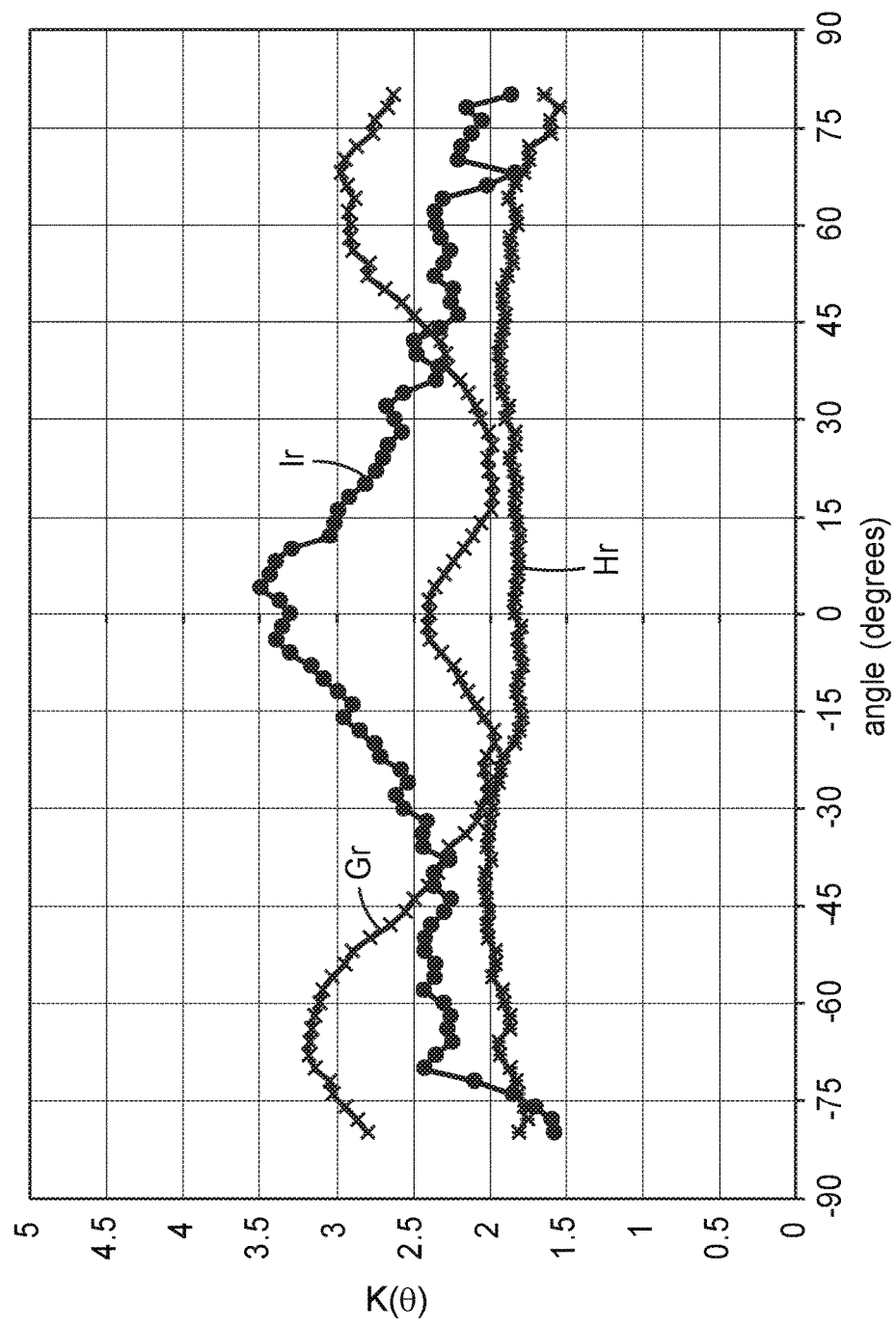
FIG. 9B shows a plot of contrast vs angle for decorative microsphere articles.

FIG. 6 shows a schematic of views from a decorative microsphere article, according to one aspect of the disclosure. Each of the elements 610-630 shown in FIG. 6 correspond to like-numbered elements 110-130 shown in FIG. 1, which have been described previously. For example, support 620 shown in FIG. 6 corresponds to support 120 shown in FIG. 1, and so on. In FIG. 6, an information layer 630 can be comprised of any of the variations as described elsewhere. Information layer 630 can, for example, be a colored film, and a viewer observing the information layer from acute angle $\theta_1$ can see a first color "A". In some cases, for example, the information layer 630 can be a red film, and the first color "A" is red, but as the angle is increased to normal to the information layer 630, the color may change to a second color "B", for example gold. In a similar manner, a viewer observing the information layer from acute angle $\theta_2$ can see a third color "C" that is the same or different that the first color "A", but as the angle is increased to normal to the information layer 630, the color again changes to the second color "B". In some cases, the changes that can be seen in the image vary continuously as the viewing angle is increased from an acute angle with the surface toward the normal to the surface. In some cases, the changes can be more abrupt, and even stepwise changes in the image can occur.

EXAMPLES

Example 1

Decorative Microsphere Articles

A transfer article was made by heating a polyester substrate coated with a thin layer of polyethylene to a temperature of 140 C to get the surface tacky, after which borosilicate glass microspheres (MoSci Inc, Rolla, Mo.) were manually sprinkled over the surface such that a monolayer of microspheres that were embedded 30-40% of their diameters in the polyethylene.

A polyurethane coating solution was then made using 11 g of a clear polyol K-Flex 188 (aliphatic polyester polyol available from King Industries, Norwalk Conn.)) mixed with 10 g of Desmodur N3300A (aliphatic polyisocyanate resin from Bayer AG), to which 1 drop of zirconium chelate complex K-Kat XC-9213 (available from King Industries, Norwalk Conn.) catalyst was added.

The resulting polyurethane coating solution was notch bar coated between the transfer article described previously and a 3M Enhanced Specular Reflector (ESR) Film (multi layer optical film or MOF), and allowed to cure at 70 C for 1 hr. Samples were then removed from the oven and the polyester substrate with the polyethylene was peeled off to form and expose the decorative microsphere article similar to that shown in FIG. 1 (light scattering layer 110 comprising borosilicate glass beads 114 in a polyurethane matrix 112 coated on ESR support layer 120). The resulting final thickness of the decorative microsphere article was 200 microns.

Example 1 had a bright diffuse reflective appearance surprisingly similar to that of an anodized aluminum surface. The coupling of surface protruding glass microspheres with the dielectric broadband specular reflector gave rise to high values of reflectance, and produced a bright white diffused appearance that was very attractive. A black marking pen was used to make an information mark on the backside of the ESR film, opposite the beaded layer. The information mark was less visible when viewed normal to the film than when viewed at an acute angle, similar to the views as shown in FIG. 5.

Color and Luminosity Measurements

Color (L*,a*,b*) and surface reflectance measurements on the decorative microsphere articles were made with an integrated sphere using an X-Rite Color i7 spectrophotometer (available from X-Rite, Grand Rapids, Mich.). Measurements were typically made in the Specular Component Excluded mode so as to characterize the "appearance" of the sample.

Comparative Example 1 was a sample of 3M ESR multi layer optical film commercially sold by 3M.

Comparative Example 2 was made by coating and curing a 5 mils thick layer of the polyurethane coating solution of Example 1 on top of the 3M ESR film.

Example 3 was made by first dispersing 10 g of borosilicate glass beads in the polyurethane coating solution of Example 1, and then coating and curing the bead-loaded solution on top of the 3M ESR film.

Example 4 was made by following the procedure described in Example 1, with the exception that a white pigmented K188 solution (available from Penn Color, Hatfield, Pa.) was used instead of the clear polyol.

TABLE 1

Color and Luminosity Measurements

| Number | Sample description | L* | a* | b* |
|---|---|---|---|---|
| Example 1 | Surface exposed microspheres in urethane matrix on MOF ESR film | 96.06 | −1.37 | 0.71 |
| C. Ex. 1 | MOF ESR film | 9.2 | 9.48 | 3.89 |
| C. Ex. 2 | Clear urethane on MOF ESR film | 21.13 | 4.55 | 0.45 |
| Example 3 | Beads fully embedded in urethane matrix on MOF ESR film | 74.31 | −0.82 | −1.13 |
| Example 4 | Surface exposed microspheres in white pigmented urethane matrix | 96.68 | −0.53 | 1.63 |

Articles made according to the present disclosure can be highly diffuse reflective and low gloss making them attractive as decorative films. The bead surfaces can have excellent smooth tactile feel and abrasion resistance, due to the presence of a monolayer of microspheres on the surface, making them valuable as surface protection films.

Example 5

Multilayer stack samples were made to measure optical performance of several decorative microsphere articles. The method described in Example 1 was used, and the polyurethane coating (either with or without borosilicate glass beads) was coated onto substrates of Vikuiti™ ESR film, reflective polarizer film (Vikuiti™ DBEF), and a red-colored reflector (CM590 Radiant Color Mirror™ film), all available from 3M Company. An opaque backing film of either black or red tape was attached to the substrate on the side opposite the coating. In some samples as indicated, surface beads of borosilicate glass were present, attached as indicated in Example 1. Table 2 shows the constructions of the samples, along with measured photopic diffuse and specular reflectance values, and ratio of specular reflectance to total reflectance (SR/TR) for each sample. The reflectance values were measured for the sample without the opaque backing film, as described below.

TABLE 2

Multilayer stacks for Contrast Measurement

| Sample | Opaque Backing | Substrate | Surface Beads | Volume Beads | Diffuse Reflectance | Specular Reflectance | SR/TR |
|---|---|---|---|---|---|---|---|
| A | black | ESR | glass | none | 85.4% | 5.2% | 5.7 |
| B | black | ESR | glass | 10 g | 86.1 | 3.4 | 3.9 |
| C | black | ESR | none | 10 g | 53.2 | 41.7 | 46.5 |
| D | black | Reflective Polarizer | glass | none | 44.1 | 2.3 | 4.9 |
| E | black | Reflective Polarizer | glass | 10 g | 52.0 | 1.1 | 2.0 |
| F | black | Reflective Polarizer | none | 10 g | 51.6 | 3.3 | 6.0 |
| Gb | black | Red Reflector | glass | none | 38.7 | 1.8 | 3.9 |
| Gr | red | Red Reflector | glass | none | 38.7 | 1.8 | 3.9 |
| Hb | black | Red Reflector | glass | 10 g | 58.9 | 1.1 | 1.7 |
| Hr | red | Red Reflector | glass | 10 g | 58.9 | 1.1 | 1.7 |
| Ib | black | Red Reflector | none | 10 g | 52.6 | 4.8 | 8.2 |
| Ir | red | Red Reflector | none | 10 g | 52.6 | 4.8 | 8.2 |

Color BRDFs (bidirectional reflectance distribution functions) were measured using a Radiant Zemax IS-SA™ (Imaging Sphere for Scatter and Appearance, available from Radiant Zemax, Redmond, Wash.) for each sample for incidence angles ($\alpha$) of 0°, 16°, 30°, 45°, 60° and 75° with and without specular exclusion. In a Cartesian x-y-z coordinate system, the incidence angle $\alpha$ is the angle that the incident beam makes with the normal (i.e., z-axis) to the x-y plane of the sample, and the incidence angle $\alpha$ is located in the y-z plane (i.e., x=0). The CIE-X, CIE-Y and CIE-Z BRDF data was exported from the Radiant Zemax IS-SA software into CSV files using settings for Integration diameter=4°, Inclination resolution=2°, and Azimuthal resolution=2°. A MATLAB program was written to read the CSV files and calculate the CIE u', v', L*, a* and b* for each data point in the CSV file.

The specular and diffuse reflectance values presented in Table 2 were obtained from the BRDF data. The incidence angle was zero degrees (normal incidence) for the diffuse reflectance data, and 16 degrees for the specular reflectance data. The size of the specular exclusion port was about 10°×10° for the diffuse reflectance measurement. The diffuse reflectance was obtained by integrating the specular excluded 0° BRDFs. The specular reflectance was obtained by integrating a 7° radius region of the BRDF about the specularly reflected direction of 16 degrees. A ratio of Specular photopic Reflectance to Total photopic Reflectance (SR/TR) measured at 16 degrees is included as a final column in Table 2.

Color and brightness contrast between a sample with tape on the back side and the same sample without tape on the back side was measured for all the samples. The higher the "tape contrast" the more visible the back side tape is from the front side. The results show that these "tape contrast" values vary with angle for many of the samples. Generally, "tape contrast" (designated by contrast K(θ)) refers to the magnitude of the difference in "appearance" between a region without tape on the backside and a region with tape on the backside of a sample. This magnitude is the distance in whichever set of color coordinates that is used. For instance, if u'v' color coordinates are used, then it is the distance in u'v' color space. If a*b* color coordinates are used, then it is the distance in a*b* color space. If L*a*b* color coordinates are used, then it is the distance in L*a*b* color space, which CIE calls ΔE*. Single dimensions can be used too. L* tape contrast refers to distance along the L* axis. u' tape contrast refers to distance along the u' axis.

FIGS. 7, 8, 9A, and 9B show plots of the contrast K(θ), vs angle θ, along a horizontal (i.e. x-axis) cross section through the center of the 16° incidence angle BRDFs for each of the samples listed in Table 2. The u'v' tape contrast is the Cartesian distance in u'v' color space between the u'v' coordinates of the sample with tape on the backside and the same sample without tape on the backside. The contrast K(θ) in the plots is proportional to the u'v' tape contrast which is given by the expression:

$$K(\theta)=100(u'v' \text{ tape contrast})=100[(u'_{with\ tape}-u'_{no\ tape})^2+(v'_{with\ tape}-v'_{no\ tape})^2]^{1/2}.$$

Following are a list of embodiments of the present disclosure.

Item 1 is a multilayer stack, comprising: a light scattering layer for scattering light disposed on a viewing side of the multilayer stack and adapted to face a viewer; an information layer for displaying information to a viewer viewing the multilayer stack from the viewing side, the information layer being disposed on a back side of the multilayer stack opposite the viewing side and adapted to face away from a viewer; and a multilayer film reflecting at least 80% of normally incident light having a first polarization state, the multilayer film disposed between the light scattering layer and the information layer, the information being less viewable by a viewer viewing the multilayer stack from the viewing side along a first direction normal to the multilayer stack than along a second direction making an acute angle with the first direction.

Item 2 is the multilayer stack of item 1, wherein the multilayer film comprises a multilayer polymeric film.

Item 3 is the multilayer stack of item 1 or item 2, wherein the multilayer film comprises a multilayer inorganic film.

Item 4 is the multilayer stack of item 1 to item 3, wherein the light scattering layer comprises at least one first region that does not scatter light and at least one second region that scatters light.

Item 5 is the multilayer stack of item 1 to item 4, wherein at least one first region of the light scattering layer primarily diffusely reflects collimated incident light and at least one second region of the light scattering layer primarily specularly reflects collimated incident light.

Item 6 is the multilayer stack of item 1 to item 5, wherein substantial portions of each two neighboring major surfaces in the multilayer stack are in direct physical contact with each other.

Item 7 is the multilayer stack of item 6, wherein at least 50% of each two neighboring major surfaces in the multilayer stack are in direct physical contact with each other.

Item 8 is the multilayer stack of item 6, wherein at least 70% of each two neighboring major surfaces in the multilayer stack are in direct physical contact with each other.

Item 9 is the multilayer stack of item 6, wherein at least 90% of each two neighboring major surfaces in the multilayer stack are in direct physical contact with each other.

Item 10 is the multilayer stack of item 1 to item 9, not having an air gap between any two neighboring major surfaces in the multilayer stack.

Item 11 is the multilayer stack of item 1 to item 10, wherein the light scattering layer comprises a volume light scattering layer.

Item 12 is the multilayer stack of item 11, wherein the volume light scattering layer comprises a plurality of scattering elements dispersed in a binder.

Item 13 is the multilayer stack of item 12, wherein a difference between indices of refraction of the binder and the scattering elements is at least 0.05.

Item 14 is the multilayer stack of item 12 or item 13, wherein a difference between indices of refraction of the binder and the scattering elements is at least 0.1.

Item 15 is the multilayer stack of item 12 to item 14, wherein a difference between indices of refraction of the binder and the scattering elements is in a range from 0.05 to 0.8.

Item 16 is the multilayer stack of item 12 to item 15, wherein a difference between indices of refraction of the binder and the scattering elements is in a range from 0.1 to 0.5.

Item 17 is the multilayer stack of item 12 to item 16, wherein a difference between indices of refraction of the binder and the scattering elements is in a range from 0.1 to 0.3.

Item 18 is the multilayer stack of item 11 to item 17, wherein the volume light scattering layer has a thickness in a range from 100 to 250 microns.

Item 19 is the multilayer stack of item 12 to item 18, wherein the plurality of scattering elements comprises a plurality of organic particles.

Item 20 is the multilayer stack of item 12 to item 19, wherein the plurality of scattering elements comprises a plurality of inorganic particles.

Item 21 is the multilayer stack of item 19 or item 20, wherein an average size of the particles is in a range from 2 to 200 microns.

Item 22 is the multilayer stack of item 11 to item 21, wherein the volume light scattering layer comprises about 10% to about 80% by weight of the scattering elements.

Item 23 is the multilayer stack of item 1 to item 22, wherein the light scattering layer comprises a surface light scattering layer.

Item 24 is the multilayer stack of item 23, wherein the surface light scattering layer comprises a plurality of scattering elements disposed on a major surface of the surface light scattering layer.

Item 25 is the multilayer stack of item 24, wherein the major surface is on the viewing side of the multilayer stack.

Item 26 is the multilayer stack of item 24, wherein the major surface is on the back side of the multilayer stack.

Item 27 is the multilayer stack of item 1 to item 26, wherein the light scattering layer comprises a volume light scattering layer and a surface light scattering layer.

Item 28 is the multilayer stack of item 27, wherein light is scattered more by the volume light scattering layer than by the surface light scattering layer.

Item 29 is the multilayer stack of item 27, wherein light is scattered less by the volume light scattering layer than by the surface light scattering layer.

Item 30 is the multilayer stack of item 1 to item 29, wherein the light scattering layer is a substantially symmetric light scattering layer.

Item 31 is the multilayer stack of item 30, wherein the light scattering layer scatters normally incident light in a first scattering direction with a first viewing angle $A_H$, and in a second scattering direction orthogonal to the first scattering direction with a second viewing angle $A_V$, $A_H/A_V$ being in a range from 0.8 to 1.2.

Item 32 is the multilayer stack of item 1 to item 29, wherein the light scattering layer is a substantially asymmetric light scattering layer.

Item 33 is the multilayer stack of item 32, wherein the light scattering layer scatters normally incident light in a first scattering direction with a first viewing angle $A_H$, and in a second scattering direction orthogonal to the first scattering direction with a second viewing angle $A_V$, $A_H/A_V$ being less than 0.8 or greater than 1.2.

Item 34 is the multilayer stack of item 1 to item 29 scattering light incident on the multilayer stack from the viewing side in a first scattering direction with a first viewing angle $A_H$, and in a second scattering direction orthogonal to the first scattering direction with a second viewing angle $A_V$, $A_H/A_V$ being in a range from 0.8 to 1.2.

Item 35 is the multilayer stack of item 1 to item 29 scattering light incident on the multilayer stack from the viewing side in a first scattering direction with a first viewing angle $A_H$, and in a second scattering direction orthogonal to the first scattering direction with a second viewing angle $A_V$, $A_H/A_V$ being less than 0.8 or greater than 1.2.

Item 36 is the multilayer stack of item 1 to item 35, wherein the light scattering layer is substantially a monolayer of particles.

Item 37 is the multilayer stack of item 1 to item 36 having a diffuse photopic reflectance of at least 5%.

Item 38 is the multilayer stack of item 1 to item 37 having a specular photopic reflectance of at most 70%.

Item 39 is the multilayer stack of item 1 to item 38, wherein the information comprises indicia.

Item 40 is the multilayer stack of item 39, wherein the indicia comprises at least one of a letter, a word, an alphanumeric, a symbol, a logo, a text, a picture, an image and a pattern.

Item 41 is the multilayer stack of item 39 or item 40, wherein the indicia comprises a visible color indicia.

Item 42 is the multilayer stack of item 1 to item 41, wherein the information layer comprises an indicia portion comprising the indicia and a background portion not comprising any indicia.

Item 43 is the multilayer stack of item 42, wherein the indicia portion comprises a first color, the first color being one of black, red, blue and green.

Item 44 is the multilayer stack of item 39 to item 43, wherein the indicia comprises a static image.

Item 45 is the multilayer stack of item 39 to item 44, wherein the indicia comprises a dynamic image.

Item 46 is the multilayer stack of item 39 to item 45, wherein the indicia is printed on a major surface of the multilayer film.

Item 47 is the multilayer stack of item 1 to item 46, wherein the information comprises color.

Item 48 is the multilayer stack of item 1 to item 47, wherein the information layer is a continuous layer.

Item 49 is the multilayer stack of item 1 to item 48, wherein the information layer is a discontinuous layer.

Item 50 is the multilayer stack of item 1 to item 49, wherein the information is printed on a major surface of the multilayer film.

Item 51 is the multilayer stack of item 1 to item 50, wherein the multilayer polymeric film reflects at least 90% of normally incident light having the first polarization state.

Item 52 is the multilayer stack of item 1 to item 51, wherein the multilayer polymeric film reflects at least 95% of normally incident light having the first polarization state.

Item 53 is the multilayer stack of item 1 to item 52, wherein the multilayer film reflects at least 80% of normally incident light having a second polarization state orthogonal to the first polarization state.

Item 54 is the multilayer stack of item 53, wherein the multilayer film reflects at least 90% of normally incident light having the second polarization state.

Item 55 is the multilayer stack of item 53, wherein the multilayer film reflects at least 95% of normally incident light having the second polarization state.

Item 56 is the multilayer stack of item 1 to item 55, wherein the multilayer film specularly reflects at least 80% of normally incident light having the first polarization state.

Item 57 is the multilayer stack of item 1 to item 56, wherein the multilayer film transmits at least 80% of normally incident light having a second polarization state orthogonal to the first polarization state.

Item 58 is the multilayer stack of item 57, wherein the multilayer film transmits at least 90% of normally incident light having the second polarization state.

Item 59 is the multilayer stack of item 57, wherein the multilayer film transmits at least 95% of normally incident light having the second polarization state.

Item 60 is the multilayer stack of item 1 to item 59, wherein the multilayer film comprises birefringent first polymeric optical layers alternating with second polymeric optical layers.

Item 61 is the multilayer stack of item 1 to item 60, wherein the multilayer film comprises isotropic first polymeric optical layers alternating with isotropic second polymeric optical layers.

Item 62 is the multilayer stack of item 1 to item 61, wherein the multilayer film reflects light by optical interference.

Item 63 is the multilayer stack of item 1 to item 62, wherein the multilayer film reflects at least 80% of normally incident light having the first polarization state in a wavelength range from about 440 to 600 nanometers.

Item 64 is the multilayer stack of item 1 to item 63, wherein the information layer comprises an indicia portion and a background portion not comprising any indicia, such that for white light incident on the multilayer stack from the viewing side along an incident direction making an angle α with the first direction: a first light reflected from a first region of the multilayer stack corresponding to the indicia portion along a first reflected direction making an angle θ with the first direction has color coordinates $u_1'$ and $v_1'$; a second light reflected from a second region of the multilayer stack corresponding to the background portion along the first reflected direction has color coordinates $u_2'$ and $v_2'$; a contrast of the multilayer stack along the first reflected direction is defined as: $K(\theta)=100((u_1'-u_2')^2+(v_1'-v_2'))^{1/2}$; such that for $\alpha$ in a range from about 5 degrees to about 20 degrees, K(0) is at most 0.2 and K(45) is at least 0.5.

Item 65 is the multilayer stack of item 64, wherein the incident while light has color coordinates $u_o'$ of about 0.21 and $v_o'$ of about 0.47.

Item 66 is the multilayer stack of item 64 or item 65, wherein for $\alpha$ in a range from about 10 degrees to about 20 degrees, K(0) is at most 0.2 and K(45) is at least 0.5.

Item 67 is the multilayer stack of item 64, wherein for $\alpha$ in a range from about 5 degrees to about 20 degrees, K(0) is at most 0.1 and K(45) is at least 0.75.

Item 68 is the multilayer stack of item 64, wherein for $\alpha$ in a range from about 5 degrees to about 20 degrees, K(0) is at most 0.1 and K(45) is at least 1.

Item 69 is the multilayer stack of item 1 to item 68, wherein the information layer comprises an indicia portion and a background portion not comprising any indicia, such that for white light incident on the multilayer stack from the viewing side along an incident direction making an angle $\alpha$ with the first direction: a first light reflected from a first region of the multilayer stack corresponding to the indicia portion along a first reflected direction making an angle $\theta$ with the first direction has color coordinates $u_1'$ and $v_1'$; a second light reflected from a second region of the multilayer stack corresponding to the background portion along the first reflected direction has color coordinates $u_2'$ and $v_2'$; a contrast of the multilayer stack along the first reflected direction is defined as: $K(\theta)=100((u_1'-u_2')^2+(v_1'-v_2'))^{1/2}$; such that for $\alpha$ in a range from about 5 degrees to about 20 degrees, $K(\theta)$ is at most 0.2 and $K(\theta)$ is at least 1 for $\theta$ in a range from 50 to 80 degrees.

Item 70 is the multilayer stack of item 69, wherein for $\alpha$ in a range from about 10 degrees to about 20 degrees, K(0) is at most 0.2 and $K(\theta)$ is at least 1 for $\theta$ in a range from 50 to 80 degrees.

Item 71 is the multilayer stack of item 69, wherein for $\alpha$ in a range from about 10 degrees to about 20 degrees, K(0) is at most 0.2 and $K(\theta)$ is at least 1.5 for $\theta$ in a range from 50 to 80 degrees.

Item 72 is the multilayer stack of item 1 to item 71, wherein the information layer comprises an indicia portion and a background portion not comprising any indicia, such that for white light incident on the multilayer stack from the viewing side along an incident direction making an angle $\alpha$ with the first direction: a first light reflected from a first region of the multilayer stack corresponding to the indicia portion along a first reflected direction making an angle $\theta$ with the first direction has color coordinates $u_1'$ and $v_1'$; a second light reflected from a second region of the multilayer stack corresponding to the background portion along the first reflected direction has color coordinates $u_2'$ and $v_2'$; a contrast of the multilayer stack along the first reflected direction is defined as: $K(\theta)=100((u_1'-u_2')^2+(v_1'-v_2'))^{1/2}$; such that for $\alpha$ in a range from about 5 degrees to about 20 degrees, $K(\theta)$ has a maximum value $K_{max}$ for $\theta$ in a range from 15 to 80 degrees, $K_{max}$ being greater than K(15).

Item 73 is the multilayer stack of item 72, wherein $K_{max}$ is at least 1.

Item 74 is the multilayer stack of item 72, wherein $K_{max}$ is at least 2.

Item 75 is the multilayer stack of item 72, wherein $K_{max}$ is at least 3.

Item 76 is the multilayer stack of item 1 to item 75, wherein the information layer comprises an indicia portion and a background portion not comprising any indicia, such that for white light incident on the multilayer stack from the viewing side along an incident direction making an angle $\alpha$ with the first direction: a first light reflected from a first region of the multilayer stack corresponding to the indicia portion along a first reflected direction making an angle $\theta$ with the first direction has color coordinates $u_1'$ and $v_1'$; a second light reflected from a second region of the multilayer stack corresponding to the background portion along the first reflected direction has color coordinates $u_2'$ and $v_2'$; a contrast of the multilayer stack along the first reflected direction is defined as: $K(\theta)=100((u_1'-u_2')^2+(v_1'-v_2'))^{1/2}$; such that for $\alpha$ in a range from about 5 degrees to about 20 degrees, K(45) is greater than K(0).

Item 77 is the multilayer stack of item 76, wherein for $\alpha$ in a range from about 5 degrees to about 20 degrees, K(60) is greater than K(45).

Item 78 is the multilayer stack of item 1 to item 77, further comprising an optically opaque layer disposed on the back side of the multilayer stack and adhered to the information layer.

Item 79 is the multilayer stack of item 78, wherein the information layer is disposed between the multilayer polymeric film and the optically opaque layer.

Item 80 is the multilayer stack of item 78 or item 79, wherein a total optical transmittance of the optically opaque layer is less than 5%.

Item 81 is the multilayer stack of item 1 to item 80, wherein the information layer comprises an indicia portion and a background portion not comprising any indicia, such that for white light incident on the multilayer stack from the viewing side along an incident direction making an angle $\alpha$ with the first direction: a first light reflected from a first region of the multilayer stack corresponding to the indicia portion along a first reflected direction making an angle $\theta$ with the first direction has an $L_1*$ value in the CIE $L*a*b*$ space; a second light reflected from a second region of the multilayer stack corresponding to the background portion along the first reflected direction has an $L_2*$ value in the CIE $L*a*b*$ space; a contrast of the multilayer stack along the first reflected direction is defined as: $L(\theta)=|L_1*-L_2*|$; such that for $\alpha$ in a range from about 5 degrees to about 20 degrees, L(0) is at most 2 and L(45) is at least 3.

Item 82 is the multilayer stack of item 81, wherein the incident while light has color coordinates $u_o'$ of about 0.21 and $v_o'$ of about 0.47.

Item 83 is the multilayer stack of item 81 or item 82, wherein for $\alpha$ in a range from about 10 degrees to about 20 degrees, L(0) is at most 1.5 and L(45) is at least 4.

Item 84 is the multilayer stack of item 81 to item 83, wherein for $\alpha$ in a range from about 5 degrees to about 20 degrees, $L(\theta)$ monotonically increases as $\theta$ increases from 0 to 60 degrees.

Item 85 is the multilayer stack of item 81 to item 84, wherein for $\alpha$ in a range from about 10 degrees to about 20 degrees, $L(\theta)$ has a peak in range for $\theta$ from 0 to 80 degrees.

Item 86 is the multilayer stack of item 81 to item 85, wherein for $\alpha$ in a range from about 10 degrees to about 20 degrees, L(60)–L(0) is at least 1.5.

Item 87 is the multilayer stack of item 81 to item 86, wherein for $\alpha$ in a range from about 10 degrees to about 20 degrees, L(60)–L(0) is at least 4.

Item 88 is the multilayer stack of item 81 to item 87, wherein for $\alpha$ in a range from about 10 degrees to about 20 degrees, L(60)–L(0) is at least 8.

Item 89 is the multilayer stack of item 81 to item 88, wherein for α in a range from about 10 degrees to about 20 degrees, L(60)–L(0) is at least 10.

Item 90 is a multilayer stack, comprising: an optically opaque layer having a total optical transmittance of less than 5%; an information layer comprising indicia disposed on the optically opaque layer; a multilayer film disposed on the information layer and reflecting by optical interference at least 80% of normally incident light having a first polarization state and at least 80% of normally incident light having a second polarization state orthogonal to the first polarization state; and a light scattering layer disposed on the multilayer film, such that when the multilayer stack is viewed from the light scattering side and as compared to a multilayer stack that has the same construction except for not having the light scattering layer, the indicia is substantially equally discernible along a first direction normal to the multilayer stack and substantially more discernible along a second direction making an acute angle with the first direction.

Item 91 is the multilayer stack of item 90, wherein the acute angle is at least 30 degrees.

Item 92 is the multilayer stack of item 90, wherein the acute angle is between 30 and 75 degrees.

Item 93 is the multilayer stack of item 90 to item 92, wherein the multilayer film comprises a multilayer polymeric film.

Item 94 is the multilayer stack of item 90 to item 93, wherein the multilayer film comprises a multilayer inorganic film.

Item 95 is the multilayer stack of item 90 to item 94, wherein the light scattering layer comprises at least one first region that does not scatter light and at least one second region that scatters light.

Item 96 is the multilayer stack of item 90 to item 95, wherein at least one first region of the light scattering layer primarily diffusely reflects collimated incident light and at least one second region of the light scattering layer primarily specularly reflects collimated incident light.

Item 97 is the multilayer stack of item 90 to item 96, wherein substantial portions of each two neighboring major surfaces in the multilayer stack are in direct physical contact with each other.

Item 98 is the multilayer stack of item 97, wherein at least 50% of each two neighboring major surfaces in the multilayer stack are in direct physical contact with each other.

Item 99 is the multilayer stack of item 97, wherein at least 70% of each two neighboring major surfaces in the multilayer stack are in direct physical contact with each other.

Item 100 is the multilayer stack of item 97, wherein at least 90% of each two neighboring major surfaces in the multilayer stack are in direct physical contact with each other.

Item 101 is the multilayer stack of item 90 to item 100 not having an air gap between any two neighboring major surfaces in the multilayer stack.

Item 102 is the multilayer stack of item 90 to item 101, wherein the light scattering layer comprises a volume light scattering layer.

Item 103 is the multilayer stack of item 102, wherein the volume light scattering layer comprises a plurality of scattering elements dispersed in a binder.

Item 104 is the multilayer stack of item 103, wherein a difference between indices of refraction of the binder and the scattering elements is at least 0.05.

Item 105 is the multilayer stack of item 103 or item 104, wherein a difference between indices of refraction of the binder and the scattering elements is at least 0.1.

Item 106 is the multilayer stack of item 103 to item 105, wherein a difference between indices of refraction of the binder and the scattering elements is in a range from 0.05 to 0.8.

Item 107 is the multilayer stack of item 103 to item 106, wherein a difference between indices of refraction of the binder and the scattering elements is in a range from 0.1 to 0.5.

Item 108 is the multilayer stack of item 103 to item 107, wherein a difference between indices of refraction of the binder and the scattering elements is in a range from 0.1 to 0.3.

Item 109 is the multilayer stack of item 102 to item 108, wherein the volume light scattering layer has a thickness in a range from 100 to 250 microns.

Item 110 is the multilayer stack of item 103 to item 109, wherein the plurality of scattering elements comprises a plurality of organic particles.

Item 111 is the multilayer stack of item 103 to item 110, wherein the plurality of scattering elements comprises a plurality of inorganic particles.

Item 112 is the multilayer stack of items 110 or 111, wherein an average size of the particles is in a range from 2 to 200 microns.

Item 113 is the multilayer stack of item 102 to item 112, wherein the volume light scattering layer comprises about 10% to about 80% by weight of the scattering elements.

Item 114 is the multilayer stack of item 90 to item 113, wherein the light scattering layer comprises a surface light scattering layer.

Item 115 is the multilayer stack of item 114, wherein the surface light scattering layer comprises a plurality of scattering elements disposed on a major surface of the surface light scattering layer.

Item 116 is the multilayer stack of item 115, wherein the major surface is on the viewing side of the multilayer stack.

Item 117 is the multilayer stack of item 115, wherein the major surface is on the back side of the multilayer stack.

Item 118 is the multilayer stack of item 90 to item 117, wherein the light scattering layer comprises a volume light scattering layer and a surface light scattering layer.

Item 119 is the multilayer stack of item 118, wherein light is scattered more by the volume light scattering layer than by the surface light scattering layer.

Item 120 is the multilayer stack of item 118, wherein light is scattered less by the volume light scattering layer than by the surface light scattering layer.

Item 121 is the multilayer stack of item 90 to item 120, wherein the light scattering layer is a substantially symmetric light scattering layer.

Item 122 is the multilayer stack of item 121, wherein the light scattering layer scatters normally incident light in a first scattering direction with a first viewing angle $A_H$, and in a second scattering direction orthogonal to the first scattering direction with a second viewing angle $A_V$, $A_H/A_V$ being in a range from 0.8 to 1.2.

Item 123 is the multilayer stack of item 90 to item 120, wherein the light scattering layer is a substantially asymmetric light scattering layer.

Item 124 is the multilayer stack of item 123, wherein the light scattering layer scatters normally incident light in a first scattering direction with a first viewing angle $A_H$, and in a second scattering direction orthogonal to the first scattering direction with a second viewing angle $A_V$, $A_H/A_V$ being less than 0.8 or greater than 1.2.

Item 125 is the multilayer stack of item 90 to item 124, scattering light incident on the multilayer stack from the viewing side in a first scattering direction with a first viewing angle $A_H$, and in a second scattering direction orthogonal to the first scattering direction with a second viewing angle $A_V$, $A_H/A_V$ being in a range from 0.8 to 1.2.

Item 126 is the multilayer stack of item 90 to item 125, scattering light incident on the multilayer stack from the viewing side in a first scattering direction with a first viewing angle $A_H$, and in a second scattering direction orthogonal to the first scattering direction with a second viewing angle $A_V$, $A_H/A_V$ being less than 0.8 or greater than 1.2.

Item 127 is the multilayer stack of item 90 to item 126, wherein the light scattering layer is substantially a monolayer of particles.

Item 128 is the multilayer stack of item 90 to item 127, having a diffuse photopic reflectance of at least 5%.

Item 129 is the multilayer stack of item 90 to item 128, having a specular photopic reflectance of at most 70%.

Item 130 is the multilayer stack of item 90 to item 129, wherein the indicia comprises at least one of a letter, a word, an alphanumeric, a symbol, a logo, a text, a picture, an image and a pattern.

Item 131 is the multilayer stack of item 90 to item 130, wherein the indicia comprises a visible color indicia.

Item 132 is the multilayer stack of item 90 to item 131, wherein the information layer comprises an indicia portion comprising the indicia and a background portion not comprising any indicia.

Item 133 is the multilayer stack of item 90 to item 132, wherein the indicia portion comprises a first color, the first color being one of black, red, blue and green.

Item 134 is the multilayer stack of item 90 to item 133, wherein the indicia comprises a static image.

Item 135 is the multilayer stack of item 90 to item 134, wherein the indicia comprises a dynamic image.

Item 136 is the multilayer stack of item 90 to item 135, wherein the indicia is printed on a major surface of the multilayer film.

Item 137 is the multilayer stack of item 90 to item 136, wherein the information comprises color.

Item 138 is the multilayer stack of item 90 to item 137, wherein the information layer is a continuous layer.

Item 139 is the multilayer stack of item 90 to item 138, wherein the information layer is a discontinuous layer.

Item 140 is the multilayer stack of item 90 to item 139, wherein the information is printed on a major surface of the multilayer film.

Item 141 is the multilayer stack of item 90 to item 140, wherein the multilayer film reflects at least 90% of normally incident light having the first polarization state.

Item 142 is the multilayer stack of item 90 to item 141, wherein the multilayer film reflects at least 95% of normally incident light having the first polarization state.

Item 143 is the multilayer stack of item 90 to item 142, wherein the multilayer film reflects at least 80% of normally incident light having the second polarization state orthogonal to the first polarization state.

Item 144 is the multilayer stack of item 143, wherein the multilayer film reflects at least 90% of normally incident light having the second polarization state.

Item 145 is the multilayer stack of item 143, wherein the multilayer film reflects at least 95% of normally incident light having the second polarization state.

Item 146 is the multilayer stack of item 90 to item 145, wherein the multilayer film specularly reflects at least 80% of normally incident light having the first polarization state.

Item 147 is the multilayer stack of item 90 to item 146, wherein the multilayer film transmits at least 80% of normally incident light having the second polarization state orthogonal to the first polarization state.

Item 148 is the multilayer stack of item 147, wherein the multilayer film transmits at least 90% of normally incident light having the second polarization state.

Item 149 is the multilayer stack of item 147, wherein the multilayer film transmits at least 95% of normally incident light having the second polarization state.

Item 150 is the multilayer stack of item 90 to item 149, wherein the multilayer film comprises birefringent first polymeric optical layers alternating with second polymeric optical layers.

Item 151 is the multilayer stack of item 90 to item 150, wherein the multilayer film comprises isotropic first polymeric optical layers alternating with isotropic second polymeric optical layers.

Item 152 is the multilayer stack of item 90 to item 151, wherein the multilayer film reflects light by optical interference.

Item 153 is the multilayer stack of item 90 to item 152, wherein the multilayer film reflects at least 80% of normally incident light having the first polarization state in a wavelength range from about 440 to 600 nanometers.

Item 154 is the multilayer stack of item 90 to item 153, wherein the information layer comprises an indicia portion and a background portion not comprising any indicia, such that for white light incident on the multilayer stack from the viewing side along an incident direction making an angle α with the first direction: a first light reflected from a first region of the multilayer stack corresponding to the indicia portion along a first reflected direction making an angle θ with the first direction has color coordinates $u_1'$ and $v_1'$; a second light reflected from a second region of the multilayer stack corresponding to the background portion along the first reflected direction has color coordinates $u_2'$ and $v_2'$; a contrast of the multilayer stack along the first reflected direction is defined as: $K(\theta)=100((u_1'-u_2')^2+(v_1'-v_2'))^{1/2}$; such that for α in a range from about 5 degrees to about 20 degrees, K(0) is at most 0.2 and K(45) is at least 0.5.

Item 155 is the multilayer stack of item 154, wherein the incident while light has color coordinates $u_o'$ of about 0.21 and $v_o'$ of about 0.47.

Item 156 is the multilayer stack of item 154 or item 155, wherein for α in a range from about 10 degrees to about 20 degrees, K(0) is at most 0.2 and K(45) is at least 0.5.

Item 157 is the multilayer stack of item 154 to item 156, wherein for α in a range from about 5 degrees to about 20 degrees, K(0) is at most 0.1 and K(45) is at least 0.75.

Item 158 is the multilayer stack of item 154 to item 157, wherein for α in a range from about 5 degrees to about 20 degrees, K(0) is at most 0.1 and K(45) is at least 1.

Item 159 is the multilayer stack of item 90 to item 158, wherein the information layer comprises an indicia portion and a background portion not comprising any indicia, such that for white light incident on the multilayer stack from the viewing side along an incident direction making an angle α with the first direction: a first light reflected from a first region of the multilayer stack corresponding to the indicia portion along a first reflected direction making an angle θ with the first direction has color coordinates $u_1'$ and $v_1'$; a second light reflected from a second region of the multilayer stack corresponding to the background portion along the first reflected direction has color coordinates $u_2'$ and $v_2'$; a contrast of the multilayer stack along the first reflected direction is defined as: $K(\theta)=100((u_1'-u_2')^2+(v_1'-v_2'))^{1/2}$; such that for $\alpha$ in a range from about 5 degrees to about 20 degrees, $K(0)$ is at most 0.2 and $K(\theta)$ is at least 1 for $\theta$ in a range from 50 to 80 degrees.

Item 160 is the multilayer stack of item 159, wherein for $\alpha$ in a range from about 10 degrees to about 20 degrees, $K(0)$ is at most 0.2 and $K(\theta)$ is at least 1 for $\theta$ in a range from 50 to 80 degrees.

Item 161 is the multilayer stack of item 159 or 160, wherein for $\alpha$ in a range from about 10 degrees to about 20 degrees, $K(0)$ is at most 0.2 and $K(\theta)$ is at least 1.5 for $\theta$ in a range from 50 to 80 degrees.

Item 162 is the multilayer stack of item 90 to item 161, wherein the information layer comprises an indicia portion and a background portion not comprising any indicia, such that for white light incident on the multilayer stack from the viewing side along an incident direction making an angle $\alpha$ with the first direction: a first light reflected from a first region of the multilayer stack corresponding to the indicia portion along a first reflected direction making an angle $\theta$ with the first direction has color coordinates $u_1'$ and $v_1'$; a second light reflected from a second region of the multilayer stack corresponding to the background portion along the first reflected direction has color coordinates $u_2'$ and $v_2'$; a contrast of the multilayer stack along the first reflected direction is defined as: $K(\theta)=100((u_1'-u_2')^2+(v_1'-v_2'))^{1/2}$; such that for $\alpha$ in a range from about 5 degrees to about 20 degrees, $K(\theta)$ has a maximum value $K_{max}$ for $\theta$ in a range from 15 to 80 degrees, $K_{max}$ being greater than $K(15)$.

Item 163 is the multilayer stack of item 162, wherein $K_{max}$ is at least 1.

Item 164 is the multilayer stack of item 162, wherein $K_{max}$ is at least 2.

Item 165 is the multilayer stack of item 162, wherein $K_{max}$ is at least 3.

Item 166 is the multilayer stack of item 90 to item 165, wherein the information layer comprises an indicia portion and a background portion not comprising any indicia, such that for white light incident on the multilayer stack from the viewing side along an incident direction making an angle $\alpha$ with the first direction: a first light reflected from a first region of the multilayer stack corresponding to the indicia portion along a first reflected direction making an angle $\theta$ with the first direction has color coordinates $u_1'$ and $v_1'$; a second light reflected from a second region of the multilayer stack corresponding to the background portion along the first reflected direction has color coordinates $u_2'$ and $v_2'$; a contrast of the multilayer stack along the first reflected direction is defined as: $K(\theta)=100((u_1'-u_2')^2+(v_1'-v_2'))^{1/2}$; such that for $\alpha$ in a range from about 5 degrees to about 20 degrees, $K(45)$ is greater than $K(0)$.

Item 167 is the multilayer stack of item 166, wherein for $\alpha$ in a range from about 5 degrees to about 20 degrees, $K(60)$ is greater than $K(45)$.

Item 168 is the multilayer stack of item 90 to item 167, further comprising an optically opaque layer disposed on the back side of the multilayer stack and adhered to the information layer.

Item 169 is the multilayer stack of item 168, wherein the information layer is disposed between the multilayer film and the optically opaque layer.

Item 170 is the multilayer stack of item 168 or item 169, wherein a total optical transmittance of the optically opaque layer is less than 5%.

Item 171 is the multilayer stack of item 90 to item 170, wherein the information layer comprises an indicia portion and a background portion not comprising any indicia, such that for white light incident on the multilayer stack from the viewing side along an incident direction making an angle $\alpha$ with the first direction: a first light reflected from a first region of the multilayer stack corresponding to the indicia portion along a first reflected direction making an angle $\theta$ with the first direction has an $L_1^*$ value in the CIE $L^*a^*b^*$ space; a second light reflected from a second region of the multilayer stack corresponding to the background portion along the first reflected direction has an $L_2^*$ value in the CIE $L^*a^*b^*$ space; a contrast of the multilayer stack along the first reflected direction is defined as: $L(\theta)=|L_1^*-L_2^*|$; such that for $\alpha$ in a range from about 5 degrees to about 20 degrees, $L(0)$ is at most 2 and $L(45)$ is at least 3.

Item 172 is the multilayer stack of item 171, wherein the incident while light has color coordinates $u_o'$ of about 0.21 and $v_o'$ of about 0.47.

Item 173 is the multilayer stack of item 171 or item 172, wherein for $\alpha$ in a range from about 10 degrees to about 20 degrees, $L(0)$ is at most 1.5 and $L(45)$ is at least 4.

Item 174 is the multilayer stack of item 171 to item 173, wherein for $\alpha$ in a range from about 5 degrees to about 20 degrees, $L(\theta)$ monotonically increases as $\theta$ increases from 0 to 60 degrees.

Item 175 is the multilayer stack of item 171 to item 174, wherein for $\alpha$ in a range from about 10 degrees to about 20 degrees, $L(\theta)$ has a peak in range for $\theta$ from 0 to 80 degrees.

Item 176 is the multilayer stack of item 171 to item 175, wherein for $\alpha$ in a range from about 10 degrees to about 20 degrees, $L(60)-L(0)$ is at least 1.5.

Item 177 is the multilayer stack of item 171 to item 176, wherein for $\alpha$ in a range from about 10 degrees to about 20 degrees, $L(60)-L(0)$ is at least 4.

Item 178 is the multilayer stack of item 171 to item 177, wherein for $\alpha$ in a range from about 10 degrees to about 20 degrees, $L(60)-L(0)$ is at least 8.

Item 179 is the multilayer stack of item 171 to item 178, wherein for $\alpha$ in a range from about 10 degrees to about 20 degrees, $L(60)-L(0)$ is at least 10.

Item 180 is a multilayer stack, comprising: a light scattering layer for scattering light disposed on a viewing side of the multilayer stack and adapted to face a viewer; an information layer for displaying information to a viewer viewing the multilayer stack from the viewing side, the information layer being disposed on a back side of the multilayer stack opposite the viewing side and adapted to face away from a viewer, the information comprising indicia; and a multilayer film reflecting at least 80% of normally incident light having a first polarization state, the multilayer film disposed between the light scattering layer and the information layer, the information being equally viewable by a viewer viewing the multilayer stack from the viewing side along a first direction normal to the multilayer stack and along a second direction making an acute angle with the first direction, the acute angle being at least 40 degrees.

Item 181 is the multilayer stack of item 180, wherein the multilayer film comprises a multilayer polymeric film.

Item 182 is the multilayer stack of item 180 or item 181, wherein the multilayer film comprises a multilayer inorganic film.

Item 183 is the multilayer stack of item 180 to item 182, wherein the light scattering layer comprises at least one first region that does not scatter light and at least one second region that scatters light.

Item 184 is the multilayer stack of item 180 to item 183, wherein at least one first region of the light scattering layer primarily diffusely reflects collimated incident light and at least one second region of the light scattering layer primarily specularly reflects collimated incident light.

Item 185 is the multilayer stack of item 180 to item 184, wherein substantial portions of each two neighboring major surfaces in the multilayer stack are in direct physical contact with each other.

Item 186 is the multilayer stack of item 185, wherein at least 50% of each two neighboring major surfaces in the multilayer stack are in direct physical contact with each other.

Item 187 is the multilayer stack of item 185, wherein at least 70% of each two neighboring major surfaces in the multilayer stack are in direct physical contact with each other.

Item 188 is the multilayer stack of item 185, wherein at least 90% of each two neighboring major surfaces in the multilayer stack are in direct physical contact with each other.

Item 189 is the multilayer stack of item 180 to item 188, not having an air gap between any two neighboring major surfaces in the multilayer stack.

Item 190 is the multilayer stack of item 180 to item 189, wherein the light scattering layer comprises a volume light scattering layer.

Item 191 is the multilayer stack of item 190, wherein the volume light scattering layer comprises a plurality of scattering elements dispersed in a binder.

Item 192 is the multilayer stack of item 191, wherein a difference between indices of refraction of the binder and the scattering elements is at least 0.05.

Item 193 is the multilayer stack of item 191 or item 192, wherein a difference between indices of refraction of the binder and the scattering elements is at least 0.1.

Item 194 is the multilayer stack of item 191 to item 193, wherein a difference between indices of refraction of the binder and the scattering elements is in a range from 0.05 to 0.8.

Item 195 is the multilayer stack of item 191 to item 194, wherein a difference between indices of refraction of the binder and the scattering elements is in a range from 0.1 to 0.5.

Item 196 is the multilayer stack of item 191 to item 195, wherein a difference between indices of refraction of the binder and the scattering elements is in a range from 0.1 to 0.3.

Item 197 is the multilayer stack of item 180 to item 196, wherein the volume light scattering layer has a thickness in a range from 100 to 250 microns.

Item 198 is the multilayer stack of item 191 to item 197, wherein the plurality of scattering elements comprises a plurality of organic particles.

Item 199 is the multilayer stack of item 191 to item 198, wherein the plurality of scattering elements comprises a plurality of inorganic particles.

Item 200 is the multilayer stack of items 198 or 199, wherein an average size of the particles is in a range from 2 to 200 microns.

Item 201 is the multilayer stack of item 180 to item 200, wherein the volume light scattering layer comprises about 10% to about 80% by weight of the scattering elements.

Item 202 is the multilayer stack of item 180 to item 201, wherein the light scattering layer comprises a surface light scattering layer.

Item 203 is the multilayer stack of item 202, wherein the surface light scattering layer comprises a plurality of scattering elements disposed on a major surface of the surface light scattering layer.

Item 204 is the multilayer stack of item 203, wherein the major surface is on the viewing side of the multilayer stack.

Item 205 is the multilayer stack of item 203, wherein the major surface is on the back side of the multilayer stack.

Item 206 is the multilayer stack of item 180 to item 205, wherein the light scattering layer comprises a volume light scattering layer and a surface light scattering layer.

Item 207 is the multilayer stack of item 206, wherein light is scattered more by the volume light scattering layer than by the surface light scattering layer.

Item 208 is the multilayer stack of item 206, wherein light is scattered less by the volume light scattering layer than by the surface light scattering layer.

Item 209 is the multilayer stack of item 180 to item 208, wherein the light scattering layer is a substantially symmetric light scattering layer.

Item 210 is the multilayer stack of item 209, wherein the light scattering layer scatters normally incident light in a first scattering direction with a first viewing angle $A_H$, and in a second scattering direction orthogonal to the first scattering direction with a second viewing angle $A_V$, $A_H/A_V$ being in a range from 0.8 to 1.2.

Item 211 is the multilayer stack of item 180 to item 210, wherein the light scattering layer is a substantially asymmetric light scattering layer.

Item 212 is the multilayer stack of item 209, wherein the light scattering layer scatters normally incident light in a first scattering direction with a first viewing angle $A_H$, and in a second scattering direction orthogonal to the first scattering direction with a second viewing angle $A_V$, $A_H/A_V$ being less than 0.8 or greater than 1.2.

Item 213 is the multilayer stack of item 180 to item 212 scattering light incident on the multilayer stack from the viewing side in a first scattering direction with a first viewing angle $A_H$, and in a second scattering direction orthogonal to the first scattering direction with a second viewing angle $A_V$, $A_H/A_V$ being in a range from 0.8 to 1.2.

Item 214 is the multilayer stack of item 180 to item 213 scattering light incident on the multilayer stack from the viewing side in a first scattering direction with a first viewing angle $A_H$, and in a second scattering direction orthogonal to the first scattering direction with a second viewing angle $A_V$, $A_H/A_V$ being less than 0.8 or greater than 1.2.

Item 215 is the multilayer stack of item 180 to item 214, wherein the light scattering layer is substantially a monolayer of particles.

Item 216 is the multilayer stack of item 180 to item 215 having a diffuse photopic reflectance of at least 5%.

Item 217 is the multilayer stack of item 180 to item 216 having a specular photopic reflectance of at most 70%.

Item 218 is the multilayer stack of item 180 to item 217, wherein the information comprises indicia.

Item 219 is the multilayer stack of item 218, wherein the indicia comprises at least one of a letter, a word, an alphanumeric, a symbol, a logo, a text, a picture, an image and a pattern.

Item 220 is the multilayer stack of item 218 or item 219, wherein the indicia comprises a visible color indicia.

Item 221 is the multilayer stack of item 180 to item 220, wherein the information layer comprises an indicia portion comprising the indicia and a background portion not comprising any indicia.

Item 222 is the multilayer stack of item 221, wherein the indicia portion comprises a first color, the first color being one of black, red, blue and green.

Item 223 is the multilayer stack of item 218 to item 222, wherein the indicia comprises a static image.

Item 224 is the multilayer stack of item 218 to item 223, wherein the indicia comprises a dynamic image.

Item 225 is the multilayer stack of item 218 to item 224, wherein the indicia is printed on a major surface of the multilayer film.

Item 226 is the multilayer stack of item 180 to item 225, wherein the information comprises color.

Item 227 is the multilayer stack of item 180 to item 226, wherein the information layer is a continuous layer.

Item 228 is the multilayer stack of item 180 to item 227, wherein the information layer is a discontinuous layer.

Item 229 is the multilayer stack of item 218 to item 228, wherein the information is printed on a major surface of the multilayer film.

Item 230 is the multilayer stack of item 180 to item 229, wherein the multilayer film reflects at least 90% of normally incident light having the first polarization state.

Item 231 is the multilayer stack of item 180 to item 230, wherein the multilayer film reflects at least 95% of normally incident light having the first polarization state.

Item 232 is the multilayer stack of item 180 to item 231, wherein the multilayer film reflects at least 80% of normally incident light having a second polarization state orthogonal to the first polarization state.

Item 233 is the multilayer stack of item 232, wherein the multilayer film reflects at least 90% of normally incident light having the second polarization state.

Item 234 is the multilayer stack of item 232, wherein the multilayer film reflects at least 95% of normally incident light having the second polarization state.

Item 235 is the multilayer stack of item 180 to item 234, wherein the multilayer film specularly reflects at least 80% of normally incident light having the first polarization state.

Item 236 is the multilayer stack of item 180 to item 235, wherein the multilayer film transmits at least 80% of normally incident light having a second polarization state orthogonal to the first polarization state.

Item 237 is the multilayer stack of item 236, wherein the multilayer film transmits at least 90% of normally incident light having the second polarization state.

Item 238 is the multilayer stack of item 236, wherein the multilayer film transmits at least 95% of normally incident light having the second polarization state.

Item 239 is the multilayer stack of item 180 to item 238, wherein the multilayer film comprises birefringent first polymeric optical layers alternating with second polymeric optical layers.

Item 240 is the multilayer stack of item 180 to item 239, wherein the multilayer film comprises isotropic first polymeric optical layers alternating with isotropic second polymeric optical layers.

Item 241 is the multilayer stack of item 180 to item 240, wherein the multilayer film reflects light by optical interference.

Item 242 is the multilayer stack of item 180 to item 241, wherein the multilayer film reflects at least 80% of normally incident light having the first polarization state in a wavelength range from about 440 to 600 nanometers.

Item 243 is the multilayer stack of item 180 to item 242, wherein the information layer comprises an indicia portion and a background portion not comprising any indicia, such that for white light incident on the multilayer stack from the viewing side along an incident direction making an angle $\alpha$ with the first direction: a first light reflected from a first region of the multilayer stack corresponding to the indicia portion along a first reflected direction making an angle $\theta$ with the first direction has color coordinates $u_1'$ and $v_1'$; a second light reflected from a second region of the multilayer stack corresponding to the background portion along the first reflected direction has color coordinates $u_2'$ and $v_2'$; a contrast of the multilayer stack along the first reflected direction is defined as: $K(\theta)=100((u_1'-u_2')^2+(v_1'-v_2'))^{1/2}$; such that for $\alpha$ in a range from about 5 degrees to about 20 degrees, $K(0)$ is at most 0.2 and $K(45)$ is at least 0.5.

Item 244 is the multilayer stack of item 243, wherein the incident while light has color coordinates $u_o'$ of about 0.21 and $v_o'$ of about 0.47.

Item 245 is the multilayer stack of item 243 or item 244, wherein for $\alpha$ in a range from about 10 degrees to about 20 degrees, $K(0)$ is at most 0.2 and $K(45)$ is at least 0.5.

Item 246 is the multilayer stack of item 243 to item 245, wherein for $\alpha$ in a range from about 5 degrees to about 20 degrees, $K(0)$ is at most 0.1 and $K(45)$ is at least 0.75.

Item 247 is the multilayer stack of item 243 to item 246, wherein for $\alpha$ in a range from about 5 degrees to about 20 degrees, $K(0)$ is at most 0.1 and $K(45)$ is at least 1.

Item 248 is the multilayer stack of item 180 to item 247, wherein the information layer comprises an indicia portion and a background portion not comprising any indicia, such that for white light incident on the multilayer stack from the viewing side along an incident direction making an angle $\alpha$ with the first direction: a first light reflected from a first region of the multilayer stack corresponding to the indicia portion along a first reflected direction making an angle $\theta$ with the first direction has color coordinates $u_1'$ and $v_1'$; a second light reflected from a second region of the multilayer stack corresponding to the background portion along the first reflected direction has color coordinates $u_2'$ and $v_2'$; a contrast of the multilayer stack along the first reflected direction is defined as: $K(\theta)=100((u_1'-u_2')^2+(v_1'-v_2'))^{1/2}$; such that for $\alpha$ in a range from about 5 degrees to about 20 degrees, $K(0)$ is at most 0.2 and $K(\theta)$ is at least 1 for 0 in a range from 50 to 80 degrees.

Item 249 is the multilayer stack of item 248, wherein for $\alpha$ in a range from about 10 degrees to about 20 degrees, $K(0)$ is at most 0.2 and $K(\theta)$ is at least 1 for $\theta$ in a range from 50 to 80 degrees.

Item 250 is the multilayer stack of item 248 or item 249, wherein for $\alpha$ in a range from about 10 degrees to about 20 degrees, $K(0)$ is at most 0.2 and $K(\theta)$ is at least 1.5 for $\theta$ in a range from 50 to 80 degrees.

Item 252 is the multilayer stack of item 180 to item 251, wherein the information layer comprises an indicia portion and a background portion not comprising any indicia, such that for white light incident on the multilayer stack from the viewing side along an incident direction making an angle $\alpha$ with the first direction: a first light reflected from a first region of the multilayer stack corresponding to the indicia portion along a first reflected direction making an angle $\theta$ with the first direction has color coordinates $u_1'$ and $v_1'$; a second light reflected from a second region of the multilayer stack corresponding to the background portion along the first reflected direction has color coordinates $u_2'$ and $v_2'$; a contrast of the multilayer stack along the first reflected direction is defined as: $K(\theta)=100((u_1'-u_2')^2+(v_1'-v_2'))^{1/2}$;

such that for α in a range from about 5 degrees to about 20 degrees, K(θ) has a maximum value $K_{max}$ for θ in a range from 15 to 80 degrees, $K_{max}$ being greater than K(15).

Item 252 is the multilayer stack of item 251, wherein $K_{max}$ is at least 1.

Item 253 is the multilayer stack of item 251, wherein $K_{max}$ is at least 2.

Item 254 is the multilayer stack of item 251, wherein $K_{max}$ is at least 3.

Item 255 is the multilayer stack of item 180 to item 254, wherein the information layer comprises an indicia portion and a background portion not comprising any indicia, such that for white light incident on the multilayer stack from the viewing side along an incident direction making an angle α with the first direction: a first light reflected from a first region of the multilayer stack corresponding to the indicia portion along a first reflected direction making an angle θ with the first direction has color coordinates $u_1'$ and $v_1'$; a second light reflected from a second region of the multilayer stack corresponding to the background portion along the first reflected direction has color coordinates $u_2'$ and $v_2'$; a contrast of the multilayer stack along the first reflected direction is defined as: $K(\theta)=100((u_1'-u_2')^2+(v_1'-v_2'))^{1/2}$; such that for α in a range from about 5 degrees to about 20 degrees, K(45) is greater than K(0).

Item 256 is the multilayer stack of item 255, wherein for α in a range from about 5 degrees to about 20 degrees, K(60) is greater than K(45).

Item 257 is the multilayer stack of item 180 to item 256, further comprising an optically opaque layer disposed on the back side of the multilayer stack and adhered to the information layer.

Item 258 is the multilayer stack of item 257, wherein the information layer is disposed between the multilayer film and the optically opaque layer.

Item 259 is the multilayer stack of item 257, wherein a total optical transmittance of the optically opaque layer is less than 5%.

Item 260 is the multilayer stack of item 180 to item 259, wherein the information layer comprises an indicia portion and a background portion not comprising any indicia, such that for white light incident on the multilayer stack from the viewing side along an incident direction making an angle α with the first direction: a first light reflected from a first region of the multilayer stack corresponding to the indicia portion along a first reflected direction making an angle θ with the first direction has an $L_1*$ value in the CIE L*a*b* space; a second light reflected from a second region of the multilayer stack corresponding to the background portion along the first reflected direction has an $L_2*$ value in the CIE L*a*b* space; a contrast of the multilayer stack along the first reflected direction is defined as: $L(\theta)=|L_1*-L_2*|$; such that for α in a range from about 5 degrees to about 20 degrees, L(0) is at most 2 and L(45) is at least 3.

Item 261 is the multilayer stack of item 260, wherein the incident while light has color coordinates $u_o'$ of about 0.21 and $v_o'$ of about 0.47.

Item 262 is the multilayer stack of item 260 or item 261, wherein for α in a range from about 10 degrees to about 20 degrees, L(0) is at most 1.5 and L(45) is at least 4.

Item 263 is the multilayer stack of item 260 to item 262, wherein for α in a range from about 5 degrees to about 20 degrees, L(θ) monotonically increases as θ increases from 0 to 60 degrees.

Item 264 is the multilayer stack of item 260 to item 263, wherein for α in a range from about 10 degrees to about 20 degrees, L(θ) has a peak in range for θ from 0 to 80 degrees.

Item 265 is the multilayer stack of item 260 to item 264, wherein for α in a range from about 10 degrees to about 20 degrees, L(60)-L(0) is at least 1.5.

Item 266 is the multilayer stack of item 260 to item 265, wherein for α in a range from about 10 degrees to about 20 degrees, L(60)-L(0) is at least 4.

Item 267 is the multilayer stack of item 260 to item 266, wherein for α in a range from about 10 degrees to about 20 degrees, L(60)-L(0) is at least 8.

Item 268 is the multilayer stack of item 260 to item 267, wherein for α in a range from about 10 degrees to about 20 degrees, L(60)-L(0) is at least 10.

Item 269 is a multilayer stack, comprising: a light scattering layer for scattering light disposed on a viewing side of the multilayer stack and adapted to face a viewer; an optically opaque layer having a total optical transmittance of less than 5% disposed on a back side of the multilayer stack opposite the viewing side and adapted to face away from a viewer; an information layer for displaying information to a viewer viewing the multilayer stack from the viewing side, the information layer disposed between the light scattering layer and the optically opaque layer; and a multilayer film reflecting at least 80% of normally incident light having a first polarization state, the multilayer film disposed between the light scattering layer and the information layer, the information being equally viewable by a viewer viewing the multilayer stack from the viewing side along a first direction normal to the multilayer stack and along a second direction making an acute angle with the first direction.

Item 270 is the multilayer stack of item 269, wherein the multilayer film comprises a multilayer polymeric film.

Item 271 is the multilayer stack of item 269 or item 270, wherein the multilayer film comprises a multilayer inorganic film.

Item 272 is the multilayer stack of item 269 to item 271, wherein the light scattering layer comprises at least one first region that does not scatter light and at least one second region that scatters light.

Item 273 is the multilayer stack of 269 to item 272, wherein at least one first region of the light scattering layer primarily diffusely reflects collimated incident light and at least one second region of the light scattering layer primarily specularly reflects collimated incident light.

Item 274 is the multilayer stack of 269 to item 273, wherein substantial portions of each two neighboring major surfaces in the multilayer stack are in direct physical contact with each other.

Item 275 is the multilayer stack of item 274, wherein at least 50% of each two neighboring major surfaces in the multilayer stack are in direct physical contact with each other.

Item 276 is the multilayer stack of item 274, wherein at least 70% of each two neighboring major surfaces in the multilayer stack are in direct physical contact with each other.

Item 277 is the multilayer stack of item 274, wherein at least 90% of each two neighboring major surfaces in the multilayer stack are in direct physical contact with each other.

Item 278 is the multilayer stack of 269 to item 277 not having an air gap between any two neighboring major surfaces in the multilayer stack.

Item 279 is the multilayer stack of 269 to item 278, wherein the light scattering layer comprises a volume light scattering layer.

Item 280 is the multilayer stack of item 279, wherein the volume light scattering layer comprises a plurality of scattering elements dispersed in a binder.

Item 281 is the multilayer stack of item 280, wherein a difference between indices of refraction of the binder and the scattering elements is at least 0.05.

Item 282 is the multilayer stack of item 280 or item 281, wherein a difference between indices of refraction of the binder and the scattering elements is at least 0.1.

Item 283 is the multilayer stack of item 280 to item 282, wherein a difference between indices of refraction of the binder and the scattering elements is in a range from 0.05 to 0.8.

Item 284 is the multilayer stack of item 280 to item 283, wherein a difference between indices of refraction of the binder and the scattering elements is in a range from 0.1 to 0.5.

Item 285 is the multilayer stack of item 280 to item 284, wherein a difference between indices of refraction of the binder and the scattering elements is in a range from 0.1 to 0.3.

Item 286 is the multilayer stack of item 279 to item 285, wherein the volume light scattering layer has a thickness in a range from 100 to 250 microns.

Item 287 is the multilayer stack of item 280 to item 286, wherein the plurality of scattering elements comprises a plurality of organic particles.

Item 288 is the multilayer stack of item 280 to item 287, wherein the plurality of scattering elements comprises a plurality of inorganic particles.

Item 289 is the multilayer stack of items 287 or 288, wherein an average size of the particles is in a range from 2 to 200 microns.

Item 290 is the multilayer stack of item 279 to item 289, wherein the volume light scattering layer comprises about 10% to about 80% by weight of the scattering elements.

Item 291 is the multilayer stack of item 269 to item 290, wherein the light scattering layer comprises a surface light scattering layer.

Item 292 is the multilayer stack of item 291, wherein the surface light scattering layer comprises a plurality of scattering elements disposed on a major surface of the surface light scattering layer.

Item 293 is the multilayer stack of item 292, wherein the major surface is on the viewing side of the multilayer stack.

Item 294 is the multilayer stack of item 292, wherein the major surface is on the back side of the multilayer stack.

Item 295 is the multilayer stack of item 269 to item 294, wherein the light scattering layer comprises a volume light scattering layer and a surface light scattering layer.

Item 296 is the multilayer stack of item 295, wherein light is scattered more by the volume light scattering layer than by the surface light scattering layer.

Item 297 is the multilayer stack of item 295, wherein light is scattered less by the volume light scattering layer than by the surface light scattering layer.

Item 298 is the multilayer stack of item 269 to item 297, wherein the light scattering layer is a substantially symmetric light scattering layer.

Item 299 is the multilayer stack of item 298, wherein the light scattering layer scatters normally incident light in a first scattering direction with a first viewing angle $A_H$, and in a second scattering direction orthogonal to the first scattering direction with a second viewing angle $A_V$, $A_H/A_V$ being in a range from 0.8 to 1.2.

Item 300 is the multilayer stack of item 269 to item 297, wherein the light scattering layer is a substantially asymmetric light scattering layer.

Item 301 is the multilayer stack of item 300, wherein the light scattering layer scatters normally incident light in a first scattering direction with a first viewing angle $A_H$, and in a second scattering direction orthogonal to the first scattering direction with a second viewing angle $A_V$, $A_H/A_V$ being less than 0.8 or greater than 1.2.

Item 302 is the multilayer stack of item 269 to item 301 scattering light incident on the multilayer stack from the viewing side in a first scattering direction with a first viewing angle $A_H$, and in a second scattering direction orthogonal to the first scattering direction with a second viewing angle $A_V$, $A_H/A_V$ being in a range from 0.8 to 1.2.

Item 303 is the multilayer stack of item 269 to item 302 scattering light incident on the multilayer stack from the viewing side in a first scattering direction with a first viewing angle $A_H$, and in a second scattering direction orthogonal to the first scattering direction with a second viewing angle $A_V$, $A_H/A_V$ being less than 0.8 or greater than 1.2.

Item 304 is the multilayer stack of item 269 to item 303, wherein the light scattering layer is substantially a monolayer of particles.

Item 305 is the multilayer stack of item 269 to item 304 having a diffuse photopic reflectance of at least 5%.

Item 306 is the multilayer stack of item 269 to item 305 having a specular photopic reflectance of at most 70%.

Item 307 is the multilayer stack of item 269 to item 306, wherein the information comprises indicia.

Item 308 is the multilayer stack of item 307, wherein the indicia comprises at least one of a letter, a word, an alphanumeric, a symbol, a logo, a text, a picture, an image and a pattern.

Item 309 is the multilayer stack of item 307 or item 308, wherein the indicia comprises a visible color indicia.

Item 310 is the multilayer stack of item 269 to item 309, wherein the information layer comprises an indicia portion comprising the indicia and a background portion not comprising any indicia.

Item 311 is the multilayer stack of item 310, wherein the indicia portion comprises a first color, the first color being one of black, red, blue and green.

Item 312 is the multilayer stack of item 307 to item 311, wherein the indicia comprises a static image.

Item 313 is the multilayer stack of item 307 to item 312, wherein the indicia comprises a dynamic image.

Item 314 is the multilayer stack of item 307 to item 313, wherein the indicia is printed on a major surface of the multilayer film.

Item 315 is the multilayer stack of item 269 to item 314, wherein the information comprises color.

Item 316 is the multilayer stack of item 269 to item 315, wherein the information layer is a continuous layer.

Item 317 is the multilayer stack of item 269 to item 314, wherein the information layer is a discontinuous layer.

Item 318 is the multilayer stack of item 307 to item 317, wherein the information is printed on a major surface of the multilayer film.

Item 319 is the multilayer stack of item 269 to item 318, wherein the multilayer film reflects at least 90% of normally incident light having the first polarization state.

Item 320 is the multilayer stack of item 269 to item 319, wherein the multilayer film reflects at least 95% of normally incident light having the first polarization state.

Item 321 is the multilayer stack of item 269 to item 320, wherein the multilayer film reflects at least 80% of normally incident light having a second polarization state orthogonal to the first polarization state.

Item 322 is the multilayer stack of item 321, wherein the multilayer film reflects at least 90% of normally incident light having the second polarization state.

Item 323 is the multilayer stack of item 321, wherein the multilayer film reflects at least 95% of normally incident light having the second polarization state.

Item 324 is the multilayer stack of item 269 to item 323, wherein the multilayer film specularly reflects at least 80% of normally incident light having the first polarization state.

Item 325 is the multilayer stack of item 269 to item 324, wherein the multilayer film transmits at least 80% of normally incident light having a second polarization state orthogonal to the first polarization state.

Item 326 is the multilayer stack of item 325, wherein the multilayer film transmits at least 90% of normally incident light having the second polarization state.

Item 327 is the multilayer stack of item 325, wherein the multilayer film transmits at least 95% of normally incident light having the second polarization state.

Item 328 is the multilayer stack of item 269 to item 327, wherein the multilayer film comprises birefringent first polymeric optical layers alternating with second polymeric optical layers.

Item 329 is the multilayer stack of item 269 to item 328, wherein the multilayer film comprises isotropic first polymeric optical layers alternating with isotropic second polymeric optical layers.

Item 330 is the multilayer stack of item 269 to item 329, wherein the multilayer film reflects light by optical interference.

Item 331 is the multilayer stack of item 269 to item 330, wherein the multilayer film reflects at least 80% of normally incident light having the first polarization state in a wavelength range from about 440 to 600 nanometers.

Item 332 is the multilayer stack of item 269 to item 331, wherein the information layer comprises an indicia portion and a background portion not comprising any indicia, such that for white light incident on the multilayer stack from the viewing side along an incident direction making an angle α with the first direction: a first light reflected from a first region of the multilayer stack corresponding to the indicia portion along a first reflected direction making an angle θ with the first direction has color coordinates $u_1'$ and $v_1'$; a second light reflected from a second region of the multilayer stack corresponding to the background portion along the first reflected direction has color coordinates $u_2'$ and $v_2'$; a contrast of the multilayer stack along the first reflected direction is defined as: $K(\theta)=100((u_1'-u_2')^2+(v_1'-v_2'))^{1/2}$; such that for α in a range from about 5 degrees to about 20 degrees, K(0) is at most 0.2 and K(45) is at least 0.5.

Item 333 is the multilayer stack of item 332, wherein the incident while light has color coordinates $u_o'$ of about 0.21 and $v_o'$ of about 0.47.

Item 334 is the multilayer stack of item 332 or item 333, wherein for α in a range from about 10 degrees to about 20 degrees, K(0) is at most 0.2 and K(45) is at least 0.5.

Item 335 is the multilayer stack of item 332 to item 334, wherein for α in a range from about 5 degrees to about 20 degrees, K(0) is at most 0.1 and K(45) is at least 0.75.

Item 336 is the multilayer stack of item 332 to item 335, wherein for α in a range from about 5 degrees to about 20 degrees, K(0) is at most 0.1 and K(45) is at least 1.

Item 337 is the multilayer stack of item 269 to item 336, wherein the information layer comprises an indicia portion and a background portion not comprising any indicia, such that for white light incident on the multilayer stack from the viewing side along an incident direction making an angle α with the first direction: a first light reflected from a first region of the multilayer stack corresponding to the indicia portion along a first reflected direction making an angle θ with the first direction has color coordinates $u_1'$ and $v_1'$; a second light reflected from a second region of the multilayer stack corresponding to the background portion along the first reflected direction has color coordinates $u_2'$ and $v_2'$; a contrast of the multilayer stack along the first reflected direction is defined as: $K(\theta)=100((u_1'-u_2')^2+(v_1'-v_2'))^{1/2}$; such that for α in a range from about 5 degrees to about 20 degrees, K(0) is at most 0.2 and K(θ) is at least 1 for 0 in a range from 50 to 80 degrees.

Item 338 is the multilayer stack of item 337, wherein for α in a range from about 10 degrees to about 20 degrees, K(0) is at most 0.2 and K(θ) is at least 1 for θ in a range from 50 to 80 degrees.

Item 339 is the multilayer stack of item 337 or item 338, wherein for α in a range from about 10 degrees to about 20 degrees, K(0) is at most 0.2 and K(θ) is at least 1.5 for θ in a range from 50 to 80 degrees.

Item 340 is the multilayer stack of item 269 to item 339, wherein the information layer comprises an indicia portion and a background portion not comprising any indicia, such that for white light incident on the multilayer stack from the viewing side along an incident direction making an angle α with the first direction: a first light reflected from a first region of the multilayer stack corresponding to the indicia portion along a first reflected direction making an angle θ with the first direction has color coordinates $u_1'$ and $v_1'$; a second light reflected from a second region of the multilayer stack corresponding to the background portion along the first reflected direction has color coordinates $u_2'$ and $v_2'$; a contrast of the multilayer stack along the first reflected direction is defined as: $K(\theta)=100((u_1'-u_2')^2+(v_1'-v_2'))^{1/2}$; such that for α in a range from about 5 degrees to about 20 degrees, K(θ) has a maximum value $K_{max}$ for θ in a range from 15 to 80 degrees, $K_{max}$ being greater than K(15).

Item 341 is the multilayer stack of item 340, wherein $K_{max}$ is at least 1.

Item 342 is the multilayer stack of item 340, wherein $K_{max}$ is at least 2.

Item 343 is the multilayer stack of item 340, wherein $K_{max}$ is at least 3.

Item 344 is the multilayer stack of item 269 to item 343, wherein the information layer comprises an indicia portion and a background portion not comprising any indicia, such that for white light incident on the multilayer stack from the viewing side along an incident direction making an angle α with the first direction: a first light reflected from a first region of the multilayer stack corresponding to the indicia portion along a first reflected direction making an angle θ with the first direction has color coordinates $u_1'$ and $v_1'$; a second light reflected from a second region of the multilayer stack corresponding to the background portion along the first reflected direction has color coordinates $u_2'$ and $v_2'$; a contrast of the multilayer stack along the first reflected direction is defined as: $K(\theta)=100((u_1'-u_2')^2+(v_1'-v_2'))^{1/2}$; such that for α in a range from about 5 degrees to about 20 degrees, K(45) is greater than K(0).

Item 345 is the multilayer stack of item 344, wherein for α in a range from about 5 degrees to about 20 degrees, K(60) is greater than K(45).

Item 346 is the multilayer stack of item 269 to item 345, further comprising an optically opaque layer disposed on the back side of the multilayer stack and adhered to the information layer.

Item 347 is the multilayer stack of item 346, wherein the information layer is disposed between the multilayer film and the optically opaque layer.

Item 348 is the multilayer stack of item 269 to item 347, wherein the information layer comprises an indicia portion and a background portion not comprising any indicia, such that for white light incident on the multilayer stack from the viewing side along an incident direction making an angle α with the first direction: a first light reflected from a first region of the multilayer stack corresponding to the indicia portion along a first reflected direction making an angle θ with the first direction has an $L_1^*$ value in the CIE L*a*b* space; a second light reflected from a second region of the multilayer stack corresponding to the background portion along the first reflected direction has an $L_2^*$ value in the CIE L*a*b* space; a contrast of the multilayer stack along the first reflected direction is defined as: $L(θ)=|L_1^*-L_2^*|$; such that for α in a range from about 5 degrees to about 20 degrees, L(0) is at most 2 and L(45) is at least 3.

Item 349 is the multilayer stack of item 348, wherein the incident while light has color coordinates $u_o'$ of about 0.21 and $v_o'$ of about 0.47.

Item 350 is the multilayer stack of item 348 or item 349, wherein for α in a range from about 10 degrees to about 20 degrees, L(0) is at most 1.5 and L(45) is at least 4.

Item 351 is the multilayer stack of item 348 to item 350, wherein for α in a range from about 5 degrees to about 20 degrees, L(θ) monotonically increases as θ increases from 0 to 60 degrees.

Item 352 is the multilayer stack of item 348 to item 351, wherein for α in a range from about 10 degrees to about 20 degrees, L(θ) has a peak in range for θ from 0 to 80 degrees.

Item 353 is the multilayer stack of 348 to item 352, wherein for α in a range from about 10 degrees to about 20 degrees, L(60)-L(0) is at least 1.5.

Item 354 is the multilayer stack of 348 to item 353, wherein for α in a range from about 10 degrees to about 20 degrees, L(60)-L(0) is at least 4.

Item 355 is the multilayer stack of 348 to item 354, wherein for α in a range from about 10 degrees to about 20 degrees, L(60)-L(0) is at least 8.

Item 356 is the multilayer stack of 348 to item 355, wherein for α in a range from about 10 degrees to about 20 degrees, L(60)-L(0) is at least 10.

Item 357 is a multilayer stack, comprising: an optically opaque layer having a total optical transmittance of less than 5%; an information layer comprising indicia disposed on the optically opaque layer; and a multilayer film disposed on the information layer and reflecting by optical interference at least 80% of each of two mutually orthogonal polarization states.

Item 358 is the multilayer stack of item 357, wherein the multilayer film comprises a multilayer polymeric film.

Item 359 is the multilayer stack of item 357 or item 358, wherein the multilayer film comprises a multilayer inorganic film.

Item 360 is the multilayer stack of item 357 to item 359, wherein substantial portions of each two neighboring major surfaces in the multilayer stack are in direct physical contact with each other.

Item 361 is the multilayer stack of item 360, wherein at least 50% of each two neighboring major surfaces in the multilayer stack are in direct physical contact with each other.

Item 362 is the multilayer stack of item 360, wherein at least 70% of each two neighboring major surfaces in the multilayer stack are in direct physical contact with each other.

Item 363 is the multilayer stack of item 360, wherein at least 90% of each two neighboring major surfaces in the multilayer stack are in direct physical contact with each other.

Item 364 is the multilayer stack of item 357 to item 363 not having an air gap between any two neighboring major surfaces in the multilayer stack.

Item 365 is the multilayer stack of item 357 to item 364, wherein the indicia comprises at least one of a letter, a word, an alphanumeric, a symbol, a logo, a text, a picture, an image and a pattern.

Item 366 is the multilayer stack of item 357 to item 365, wherein the indicia comprises a visible color indicia.

Item 367 is the multilayer stack of item 357 to item 366, wherein the information layer comprises an indicia portion comprising the indicia and a background portion not comprising any indicia.

Item 368 is the multilayer stack of item 367, wherein the indicia portion comprises a first color, the first color being one of black, red, blue and green.

Item 369 is the multilayer stack of item 357 to item 368, wherein the indicia comprises a static image.

Item 370 is the multilayer stack of item 357 to item 369, wherein the indicia comprises a dynamic image.

Item 371 is the multilayer stack of item 357 to item 370, wherein the indicia is printed on a major surface of the multilayer film.

Item 372 is the multilayer stack of item 357 to item 371, wherein the information comprises color.

Item 373 is the multilayer stack of item 357 to item 372, wherein the information layer is a continuous layer.

Item 374 is the multilayer stack of item 357 to item 373, wherein the information layer is a discontinuous layer.

Item 375 is the multilayer stack of item 357 to item 374, wherein the information is printed on a major surface of the multilayer film.

Item 376 is the multilayer stack of item 357 to item 375, wherein the multilayer film reflects at least 90% of normally incident light having the first polarization state.

Item 377 is the multilayer stack of item 357 to item 376, wherein the multilayer film reflects at least 95% of normally incident light having the first polarization state.

Item 378 is the multilayer stack of item 357 to item 377, wherein the multilayer film reflects at least 80% of normally incident light having a second polarization state orthogonal to the first polarization state.

Item 379 is the multilayer stack of item 378, wherein the multilayer film reflects at least 90% of normally incident light having the second polarization state.

Item 380 is the multilayer stack of item 378, wherein the multilayer film reflects at least 95% of normally incident light having the second polarization state.

Item 381 is the multilayer stack of item 357 to item 380, wherein the multilayer film specularly reflects at least 80% of normally incident light having the first polarization state.

Item 382 is the multilayer stack of item 357 to item 381, wherein the multilayer film transmits at least 80% of normally incident light having a second polarization state orthogonal to the first polarization state.

Item 383 is the multilayer stack of item 382, wherein the multilayer film transmits at least 90% of normally incident light having the second polarization state.

Item 384 is the multilayer stack of item 382, wherein the multilayer film transmits at least 95% of normally incident light having the second polarization state.

Item 385 is the multilayer stack of item 357 to item 384, wherein the multilayer film comprises birefringent first polymeric optical layers alternating with second polymeric optical layers.

Item 386 is the multilayer stack of item 357 to item 385, wherein the multilayer film comprises isotropic first polymeric optical layers alternating with isotropic second polymeric optical layers.

Item 387 is the multilayer stack of item 357 to item 386, wherein the multilayer film reflects light by optical interference.

Item 388 is the multilayer stack of item 357 to item 380, wherein the multilayer film reflects at least 80% of normally incident light having the first polarization state in a wavelength range from about 440 to 600 nanometers.

Item 389 is a multilayer stack, comprising: an optically opaque layer having a total optical transmittance of less than 5%; an information layer comprising indicia disposed on the optically opaque layer; and a multilayer film disposed on the information layer and reflecting by optical interference at least 80% of each of two mutually orthogonal polarization states in a first region of a visible range of the electromagnetic spectrum and transmitting by optical interference at least 80% of each of the two mutually orthogonal polarization states in remaining regions of the visible range of the electromagnetic spectrum.

Item 390 is the multilayer stack of item 389 further comprising a light scattering layer for scattering light disposed on a viewing side of the multilayer stack.

Item 391 is the multilayer stack of item 389 or item 390, wherein the first region of the visible range is a red region.

Item 392 is the multilayer stack of item 389 to item 391, wherein the first region of the visible range is a green region.

Item 393 is the multilayer stack of item 389 to item 392, wherein the first region of the visible range is a blue region.

Item 394 is the multilayer stack of item 389 to item 393, wherein the multilayer film comprises a multilayer polymeric film.

Item 395 is the multilayer stack of item 389 to item 394, wherein the multilayer film comprises a multilayer inorganic film.

Item 396 is the multilayer stack of item 389 to item 395, wherein substantial portions of each two neighboring major surfaces in the multilayer stack are in direct physical contact with each other.

Item 397 is the multilayer stack of item 396, wherein at least 50% of each two neighboring major surfaces in the multilayer stack are in direct physical contact with each other.

Item 398 is the multilayer stack of item 396, wherein at least 70% of each two neighboring major surfaces in the multilayer stack are in direct physical contact with each other.

Item 399 is the multilayer stack of item 396, wherein at least 90% of each two neighboring major surfaces in the multilayer stack are in direct physical contact with each other.

Item 400 is the multilayer stack of item 389 to item 399, not having an air gap between any two neighboring major surfaces in the multilayer stack.

Item 401 is the multilayer stack of item 389 to item 400, wherein the indicia comprises at least one of a letter, a word, an alphanumeric, a symbol, a logo, a text, a picture, an image and a pattern.

Item 402 is the multilayer stack of item 389 to item 401, wherein the indicia comprises a visible color indicia.

Item 403 is the multilayer stack of item 389 to item 402, wherein the information layer comprises an indicia portion comprising the indicia and a background portion not comprising any indicia.

Item 404 is the multilayer stack of item 403, wherein the indicia portion comprises a first color, the first color being one of black, red, blue and green.

Item 405 is the multilayer stack of item 389 to item 404, wherein the indicia comprises a static image.

Item 406 is the multilayer stack of item 389 to item 405, wherein the indicia comprises a dynamic image.

Item 407 is the multilayer stack of item 389 to item 406, wherein the indicia is printed on a major surface of the multilayer film.

Item 408 is the multilayer stack of item 389 to item 407, wherein the information comprises color.

Item 409 is the multilayer stack of item 389 to item 408, wherein the information layer is a continuous layer.

Item 410 is the multilayer stack of item 389 to item 409, wherein the information layer is a discontinuous layer.

Item 411 is the multilayer stack of item 389 to item 410, wherein the information is printed on a major surface of the multilayer film.

Item 412 is the multilayer stack of item 389 to item 411, wherein the multilayer film reflects at least 90% of normally incident light having the first polarization state.

Item 413 is the multilayer stack of item 389 to item 412, wherein the multilayer film reflects at least 95% of normally incident light having the first polarization state.

Item 414 is the multilayer stack of item 389 to item 413, wherein the multilayer film reflects at least 80% of normally incident light having a second polarization state orthogonal to the first polarization state.

Item 415 is the multilayer stack of item 414, wherein the multilayer film reflects at least 90% of normally incident light having the second polarization state.

Item 416 is the multilayer stack of item 414, wherein the multilayer film reflects at least 95% of normally incident light having the second polarization state.

Item 417 is the multilayer stack of item 389 to item 416, wherein the multilayer film specularly reflects at least 80% of normally incident light having the first polarization state.

Item 418 is the multilayer stack of item 389 to item 417, wherein the multilayer film transmits at least 80% of normally incident light having a second polarization state orthogonal to the first polarization state.

Item 419 is the multilayer stack of item 418, wherein the multilayer film transmits at least 90% of normally incident light having the second polarization state.

Item 420 is the multilayer stack of item 418, wherein the multilayer film transmits at least 95% of normally incident light having the second polarization state.

Item 421 is the multilayer stack of item 389 to item 420, wherein the multilayer film comprises birefringent first polymeric optical layers alternating with second polymeric optical layers.

Item 422 is the multilayer stack of item 389 to item 421, wherein the multilayer film comprises isotropic first polymeric optical layers alternating with isotropic second polymeric optical layers.

Item 423 is the multilayer stack of item 389 to item 422, wherein the multilayer film reflects light by optical interference.

Item 424 is the multilayer stack of item 389 to item 423, wherein the multilayer film reflects at least 80% of normally incident light having the first polarization state in a wavelength range from about 440 to 600 nanometers.

Item 425 is an electronic device having a surface that comprises the multilayer stack of any of items 1 to item 424.

Item 426 is the multilayer stack of any of item 1 to item 424, having a ratio of a specular photopic reflectance to a total photopic reflectance of at most 70%.

Unless otherwise indicated, all numbers expressing feature sizes, amounts, and physical properties used in the specification and claims are to be understood as being modified by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A multilayer stack, comprising:
   a light scattering layer for scattering light disposed on a viewing side of the multilayer stack and adapted to face a viewer;
   an information layer for displaying information to the viewer viewing the multilayer stack from the viewing side, the information layer being disposed on a back side of the multilayer stack opposite the viewing side and adapted to face away from the viewer; and
   a multilayer film reflecting at least 80% of normally incident light having a first polarization state, the multilayer film disposed between the light scattering layer and the information layer, the information being less viewable by the viewer viewing the multilayer stack from the viewing side along a first direction normal to the multilayer stack than along a second direction making an acute angle with the first direction.

2. The multilayer stack of claim 1, wherein the multilayer film comprises a multilayer polymeric film.

3. The multilayer stack of claim 1, wherein the multilayer film comprises a multilayer inorganic film.

4. The multilayer stack of claim 1, wherein the light scattering layer comprises at least one first region that does not scatter light and at least one second region that scatters light.

5. The multilayer stack of claim 1, wherein at least one first region of the light scattering layer primarily diffusely reflects collimated incident light and at least one second region of the light scattering layer primarily specularly reflects collimated incident light.

6. The multilayer stack of claim 1, wherein substantial portions of each two neighboring major surfaces in the multilayer stack are in direct physical contact with each other.

7. The multilayer stack of claim 6, wherein at least 50% of each two neighboring major surfaces in the multilayer stack are in direct physical contact with each other.

8. The multilayer stack of claim 6, wherein at least 70% of each two neighboring major surfaces in the multilayer stack are in direct physical contact with each other.

9. The multilayer stack of claim 6, wherein at least 90% of each two neighboring major surfaces in the multilayer stack are in direct physical contact with each other.

10. The multilayer stack of claim 1 not having an air gap between any two neighboring major surfaces in the multilayer stack.

11. The multilayer stack of claim 1, wherein the light scattering layer comprises a volume light scattering layer.

12. The multilayer stack of claim 11, wherein the volume light scattering layer comprises a plurality of scattering elements dispersed in a binder.

13. The multilayer stack of claim 12, wherein a difference between indices of refraction of the binder and the scattering elements is at least 0.05.

14. The multilayer stack of claim 12, wherein a difference between indices of refraction of the binder and the scattering elements is at least 0.1.

15. The multilayer stack of claim 12, wherein a difference between indices of refraction of the binder and the scattering elements is in a range from 0.05 to 0.8.

16. The multilayer stack of claim 12, wherein a difference between indices of refraction of the binder and the scattering elements is in a range from 0.1 to 0.5.

17. The multilayer stack of claim 12, wherein a difference between indices of refraction of the binder and the scattering elements is in a range from 0.1 to 0.3.

18. The multilayer stack of claim 11, wherein the volume light scattering layer has a thickness in a range from 100 to 250 microns.

19. The multilayer stack of claim 12, wherein the plurality of scattering elements comprises a plurality of organic particles.

20. The multilayer stack of claim 12, wherein the plurality of scattering elements comprises a plurality of inorganic particles.

* * * * *

UNITED STATES PATENT AND TRADEMARK OFFICE
CERTIFICATE OF CORRECTION

PATENT NO. : 9,880,332 B2  Page 1 of 1
APPLICATION NO. : 15/025936
DATED : January 30, 2018
INVENTOR(S) : Vivek Krishnan et al.

It is certified that error appears in the above-identified patent and that said Letters Patent is hereby corrected as shown below:

In the Specification

Column 15,
Line 33, delete "K(θ) is" and insert -- K(0) is --, therefor.

Column 26,
Line 44, after "1 for" delete "0" and insert -- θ --, therefor.

Column 32,
Line 16, after "1 for" delete "0" and insert -- θ --, therefor.

Signed and Sealed this
Twentieth Day of March, 2018

Andrei Iancu
*Director of the United States Patent and Trademark Office*